US010816646B2

(12) United States Patent
Lekås et al.

(10) Patent No.: US 10,816,646 B2
(45) Date of Patent: Oct. 27, 2020

(54) DISTANCE MEASUREMENT INSTRUMENT

(71) Applicant: Trimble AB, Danderyd (SE)

(72) Inventors: Johan Lekås, Ekonomiavdelningen (SE); Set Svanholm, Sollentuna (SE); Alex Slawomir Kosakowski, Täby (SE)

(73) Assignee: Trimble AB, Danderyd (SE)

( * ) Notice: Subject to any disclaimer, the term of this patent is extended or adjusted under 35 U.S.C. 154(b) by 805 days.

(21) Appl. No.: 15/623,944

(22) Filed: Jun. 15, 2017

(65) Prior Publication Data
US 2017/0285149 A1   Oct. 5, 2017

Related U.S. Application Data

(63) Continuation of application No. PCT/EP2014/078992, filed on Dec. 22, 2014.

(51) Int. Cl.
*G01S 7/48*   (2006.01)
*G01S 7/481*   (2006.01)
(Continued)

(52) U.S. Cl.
CPC .......... *G01S 7/4817* (2013.01); *G01S 7/489* (2013.01); *G01S 7/4865* (2013.01); *G01S 17/10* (2013.01); *G01S 17/42* (2013.01); *G01S 17/89* (2013.01)

(58) Field of Classification Search
None
See application file for complete search history.

(56) References Cited

U.S. PATENT DOCUMENTS 7,009,690 B2   3/2006   Kamon et al.
7,492,303 B1 *   2/2009   Levitan ............... G01S 7/024
                                            342/188
(Continued)

FOREIGN PATENT DOCUMENTS

CN      1403841 A      3/2003
CN      1926400 A      3/2007
(Continued)

OTHER PUBLICATIONS

International Preliminary Report on Patentability for Application No. PCT/EP2014/078992, dated Mar. 16, 2017, 14 pages.

*Primary Examiner* — Hovhannes Baghdasaryan
(74) *Attorney, Agent, or Firm* — Kilpatrick Townsend & Stockton LLP

(57) ABSTRACT

A distance measurement instrument and a method of operating a distance measurement instrument are disclosed. According to some embodiments, a transmit light signal is transmitted by a transmitter unit along a transmit path at an emission time and a return light signal is received by a receiver unit at a receive time along a receive path. The return light signal is converted to a return electrical signal. At least one of the transmit path and the receive path is deflected by a deflection module at a deflection angle relative to an optical axis of the instrument. A time-dependent attenuation function is selected based on information relative to the deflection angle and attenuation is applied by an attenuator to at least one of the return light signal and the return electrical signal according to the selected time-dependent function. A measured distance may be determined by a processor unit based on at least the emission time and the receive time.

18 Claims, 28 Drawing Sheets

(51) Int. Cl.
*G01S 7/489* (2006.01)
*G01S 17/42* (2006.01)
*G01S 7/4865* (2020.01)
*G01S 17/10* (2020.01)
*G01S 17/89* (2020.01)

(56) References Cited

U.S. PATENT DOCUMENTS

2003/0218919 A1   11/2003  Arita et al.
2012/0140203 A1*  6/2012  Gusev ...................... G01C 3/08
                                                            356/5.01
2014/0063482 A1    3/2014  Gusev
2014/0233012 A1    8/2014  Gusev

FOREIGN PATENT DOCUMENTS

| | | |
|---|---|---|
| CN | 102460209 A | 5/2012 |
| DE | 26 59 204 A1 | 6/1978 |
| DE | 10 2012 021831 | 5/2014 |
| EP | 1 865 336 A1 | 12/2007 |
| EP | 2 434 312 A1 | 3/2012 |
| EP | 2 455 780 A1 | 5/2012 |
| WO | 2014/010107 A1 | 1/2014 |
| WO | 2014/072105 A1 | 5/2014 |

* cited by examiner

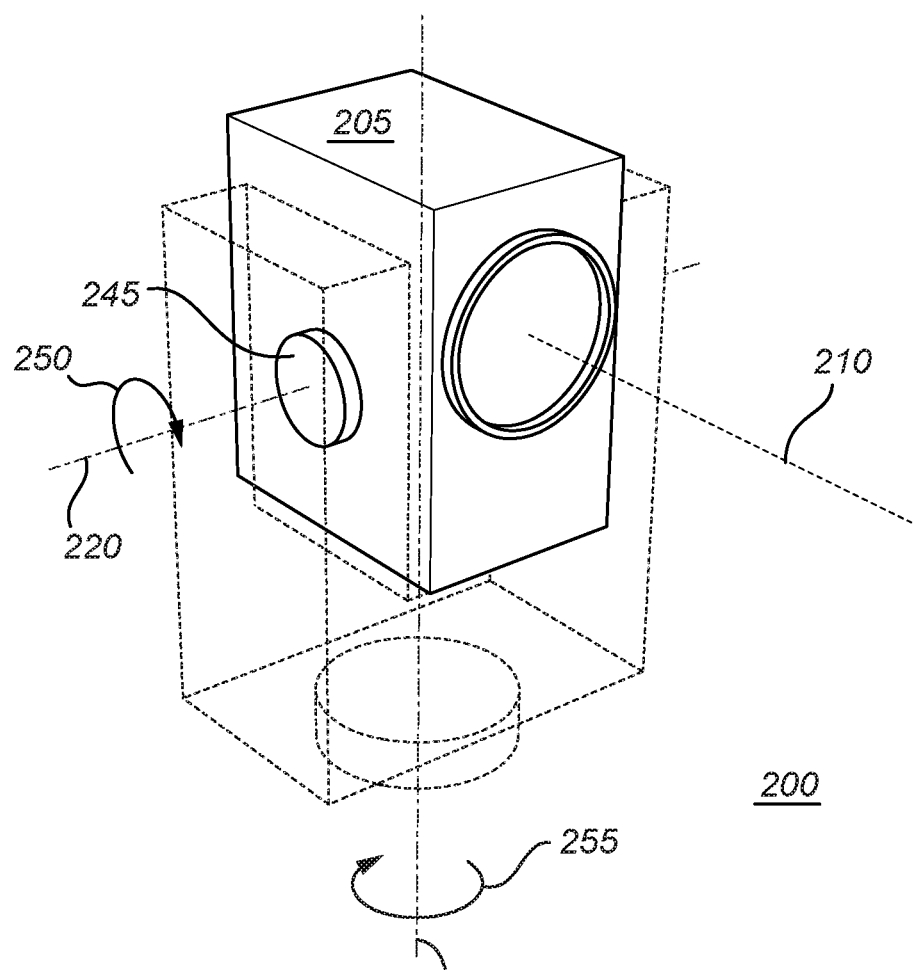
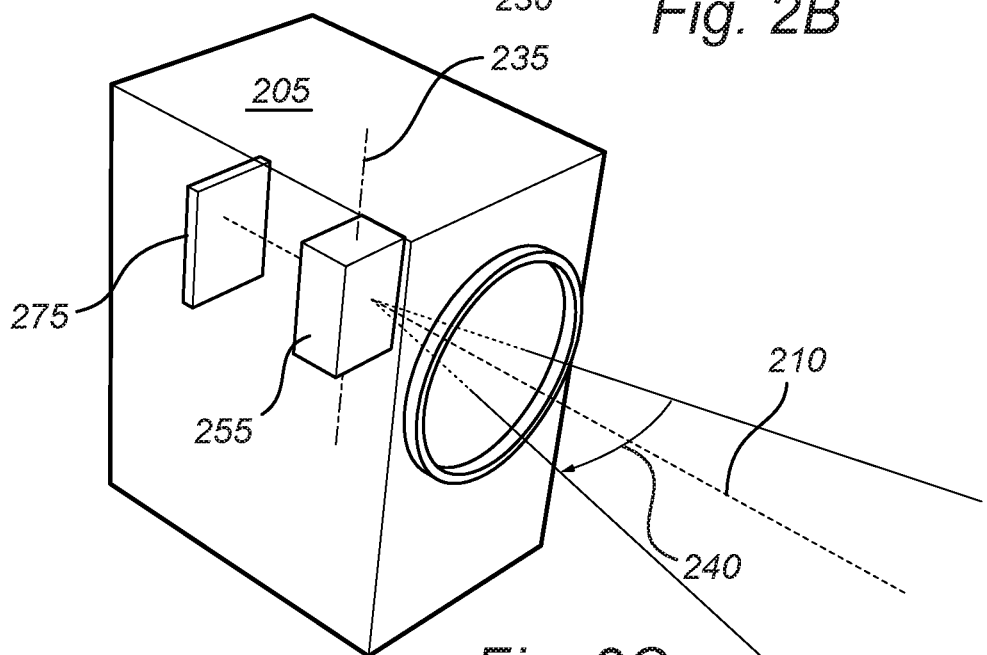
Fig. 2B
Fig. 2C

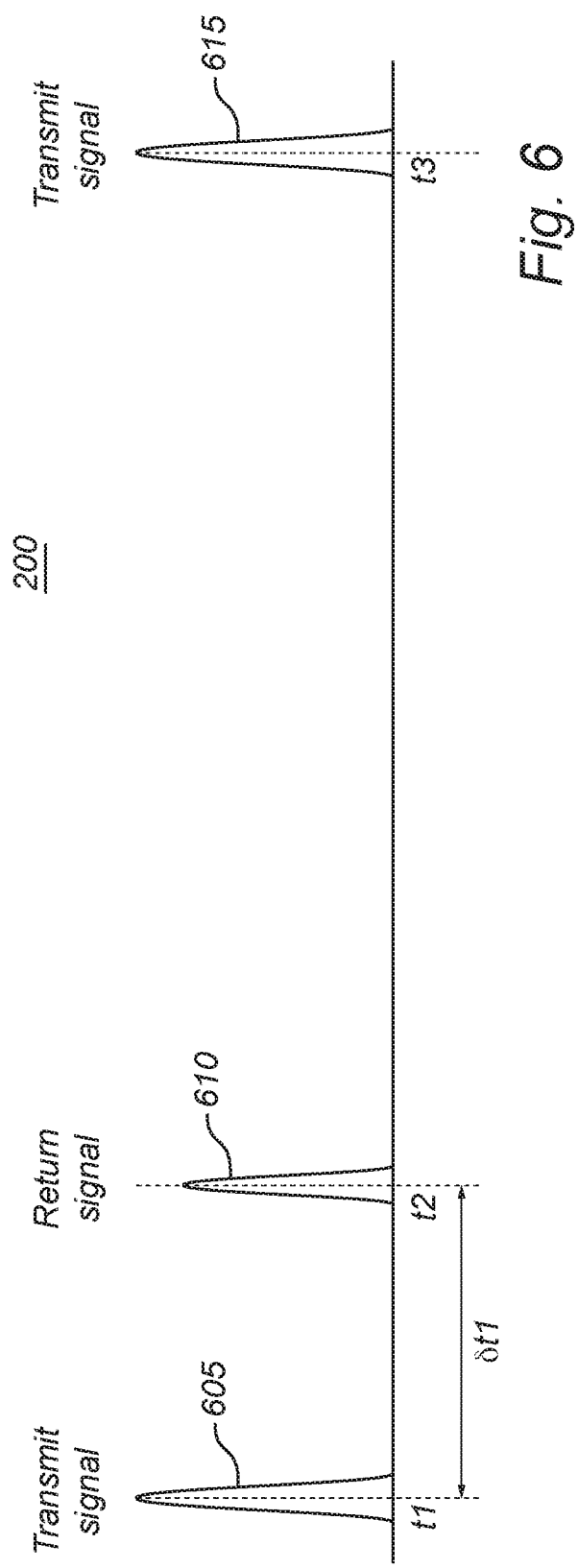

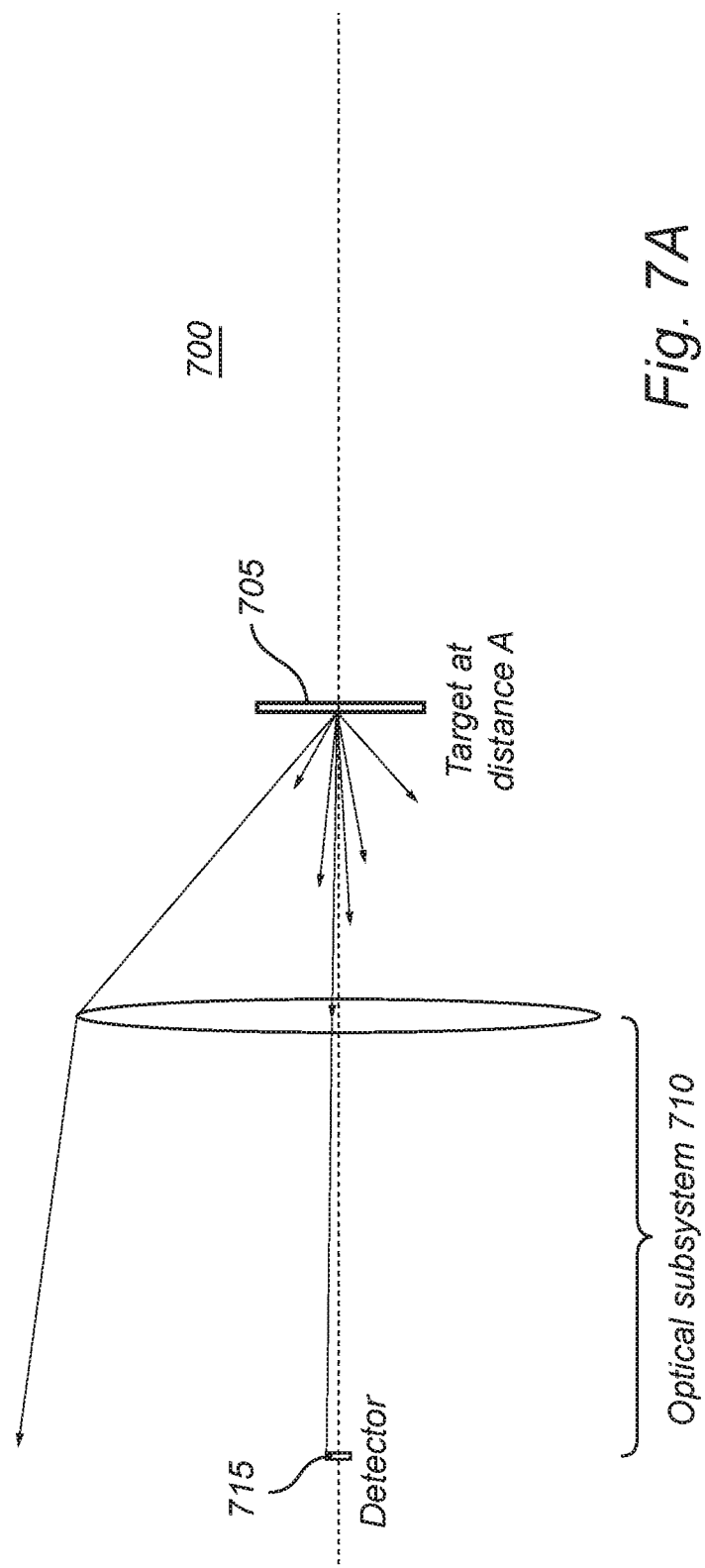

DISTANCE MEASUREMENT INSTRUMENT

CROSS-REFERENCE TO RELATED APPLICATIONS

This application is a continuation of International Application No. PCT/EP2014/078992, filed Dec. 22, 2014, the entire contents of which are incorporated herein by reference for all purposes.

TECHNICAL FIELD

The present disclosure relates to the field of electronic distance measurement. More particularly, the present disclosure relates to distance measurement with time-dependent attenuation to compensate measurement parameters.

BACKGROUND

Electronic distance measurement (EDM) units are used to measure distance for e.g. landscape surveying. In time-of-flight distance measurement, the time delay between emission and reception of a laser pulse allows for distance calculation. An emitted pulse travels to a target, e.g. a reflector, and back to a detector where it is received. The time delay between emission and reception of the laser pulse is proportional to the pulse travel distance.

For a given reflector (or target), the power level of the received pulse is assumed to be inversely proportional to the square of the pulse travel time (and the pulse travel distance) within a range of interest. The dynamic range of the power level of received pulses thus can be quite large.

EDM units are used in surveying instruments such as total stations and stationary and mobile scanners. Total stations typically make distance measurements at a lower repetition rate than scanners, so that time is available to determine the amplitude of a return pulse and to set the attenuation of the detector circuitry.

Still, surveying instruments with improved compensation are desired to obtain a faster scanning and/or a more adapted dynamic range.

SUMMARY

The present disclosure seeks to provide at least some embodiments of measuring instruments which overcome at least some of the above mentioned drawbacks. More specifically, the present disclosure aims at providing at least some embodiments offering an improved detection sensitivity for surveying instruments in which at least one of the transmit path and the receive path is deflected with a deflection angle relative to an optical axis of the instrument.

To achieve this, a distance measuring instrument and a method of operating a distance measuring instrument having the features as defined in the independent claims are provided. Further advantageous embodiments of the present disclosure are defined in the dependent claims.

According to some embodiments of a first aspect, a distance measurement instrument is provided. The distance measurement instrument may comprise a transmitter unit, a receiver unit, at least one deflection module, at least one attenuator and a processor unit. The transmitter unit is configured to emit a transmit light signal toward a target along a transmit path at an emission time. The receiver unit is configured to receive at a receive time a return light signal along a receive path and to convert the return light signal to a return electrical signal. The deflection module is configured to deflect at least one of the transmit path and the receive path with a deflection angle relative to an optical axis of the instrument. The attenuator is configured to apply attenuation to at least one of the return light signal and the return electrical signal according to a time-dependent function selected based on information relative to the deflection angle. The processor unit is configured to determine a measured distance to the target based on at least the emission time and the receive time.

According to some embodiments of a second aspect, a method of operating a distance measurement instrument is provided. The method may comprise the steps of transmitting a transmit light signal along a transmit path at an emission time and receiving at a receive time a return light signal along a receive path. The return light signal may be converted to a return electrical signal. Further, the method may comprise the step of deflecting at least one of the transmit path and the receive path at a deflection angle relative to an optical axis of the instrument and the step of selecting a time-dependent attenuation function based on information relative to the deflection angle. Attenuation may then be applied to at least one of the return light signal and the return electrical signal according to the selected time-dependent function. A distance may then be determined based on at least the emission time and the receive time.

In these embodiments, a measurement instrument in which at least one of the transmit path and the receive path is deflected at a deflection angle is provided. Deflection of the transmit path and/or the receive path may be used for scanning purposes wherein a certain deflection angle provides a certain transmit path and/or receive path corresponding to a particular position at a scene (or a particular target). By iteratively varying the deflection angle, a scene (a building for instance) or part of it may be scanned. As the power level of the received pulse (i.e. the light pulse reflected at a point of the scene) is dependent on time, a time-dependent function for attenuation of either one of the return light signal or the return electrical signal may be applied. The attenuation may be applied optically by means of e.g. an optical attenuator or electrically by means of e.g. an electrical attenuator.

For example, the time-dependent function may be inversely proportional to the square of the pulse travel time (i.e. the pulse travel distance). However, as will be further explained below, in some embodiments, other time-dependent functions may be used. The attenuation may for instance increase from the emission time (or a time related to the emission time) to a certain critical time, i.e. for light pulses reflected by a target located in the near-field, and then decrease.

In embodiments of the first and second aspect, the time-dependent function is dependent on the deflection angle at which the transmit path and/or the receive path is deflected relative to the instrument optical axis. Accordingly, a time-dependent function adapted for the deflection angle used for a certain deflection of the transmit path and/or the receive path is selected. In other words, a time-dependent function adapted for an optical path of a certain light pulse or light signal emitted from the transmitter unit (and subsequently received at the receiver unit if it has been reflected at a target) may be selected and then used for attenuating one of the return light signal and the return electrical signal. As a result, an improved detection sensitivity is obtained and the receive time to be used for calculation of the distance for this particular light pulse may be more accurately determined. In particular, the attenuation function may be adapted to reduce, and possibly eliminate, any effects relating to saturation (or too weak signals) at a sensing element (or detection unit) of the receiver unit.

The deflection module of a measuring instrument is arranged in the optical path (one of the transmit path and receive path or both) for obtaining a deflection angle. The deflection module will optically influence the optical path and affect the power level of the transmit light signal and/or the return optical pulse, which in turn will affect the return electrical pulse. Depending on the orientation or position of the deflection module, i.e. depending on the deflection angle provided by the deflection module, the transmit light signal and the return light signal will be affected differently and a specific time-dependent attenuation function may then be selected.

For a given measurement instrument and its specific optics (and in particular for a specific deflection module and its optical arrangement in the instrument), a number of time-dependent attenuation functions may be calibrated or known such that, for a certain deflection angle (for example for a certain orientation or displacement of the deflection module), and consequently for a certain light pulse emitted at such certain deflection angle a certain time-dependent attenuation function is used. The dependence of the time-dependent attenuation functions as a function of the deflection angle provided by the deflection module may for example be stored in a look-up table or other register or database. The specific optical arrangement of the deflection module in the instrument and the type of deflection module may affect the transmit light signal and the return light signal differently. A calibration procedure may therefore be envisaged to determine the set of time-dependent attenuation functions suitable for a particular surveying instrument.

The present disclosure may be applied to any types of surveying instruments in which at least one of the transmit path and the receive path is deflected, i.e. in which scanning via a deflection module is provided. The present embodiments may be applied to a geodetic scanner including a deflection module but even to a total station equipped with a deflection element for providing a scanning function or to a geodetic scanner.

The transmitter unit (or transmitter) and the receiver unit (or receiver) may be part of a distance measurement module, i.e. a module configured to perform distance measurements for determining a distance from the instrument to a target or to other elements (or points) of a scene. The distance measurement module may for example be an electronic distance measurement (EDM) system. The processor unit (or processor) may be a separate unit (or entity) or may also be part of the distance measurement module. The distance may be calculated based on time of flight measurements.

According to some embodiments, the deflection module may comprise at least one deflection element mounted for rotational motion such that at least one of the transmit path and the receive path is deflected with rotation of the deflection element. Alternatively, the deflection module may comprise at least one deflection element mounted for translational displacement such that at least one of the transmit path and the receive path is deflected with translational displacement of the deflection element. The instrument may further comprise a drive element operative to rotate the deflection element or to translate the deflection element.

Further, the instrument may comprise a drive controller operative to control rotational motion and/or translational displacement of the at least one deflection element by the drive element.

According to some embodiments, the measurement instrument may further comprise a sensor operative to detect an angle of rotation and/or a translational displacement of the deflection element. The information relative to the deflection angle may then be the detected angle of rotation and/or the detected translational displacement. The sensor may be an angle sensor like an angle encoder, a linear sensor or any other motion sensor. Accordingly, the time-dependent function for attenuation of either one of the return light signal or the return electrical signal may be selected based on the detected angle of rotation and/or the detected translational displacement.

Further, it will be appreciated that the drive controller may control the drive element in response to the sensor. The information relative to the deflection angle provided by the angle sensor may be communicated to the processor unit or another controlling entity by the sensor itself or by the drive controller such that the attenuator adapts the time-dependent attenuation function accordingly.

According to some embodiments, the information relative to the deflection angle may include a starting position of the deflection element relative to the instrument optical axis and at least one of a rotation speed, a translation speed, and a displacement profile of the deflection element. In these embodiments, a position of the deflection element at a time instant $t_2$ is derived from a known starting position of the deflection element at a time instant $t_1$ and a known rotation speed, translation speed or displacement profile. The position of the deflection element at the time instant $t_2$ will then determine the deflection angle of the transmit path and/or the receive path relative to the optical axis of the instrument and a time-dependent attenuation function adapted for this deflection angle (and accordingly the transmit light signal emitted at this deflection angle) will be applied to the attenuator. It will be appreciated that the rotation of the deflection element under the time it takes for a light signal to travel from the instrument to a target and back may be in most cases negligible such that it is considered that the deflection angle is the same or approximately the same for the transmit path and the receive path. However, depending on the rotation speed (relative to the time it takes for the light signal to travel back and forth between the instrument and the target), a difference in deflection angle provided by the deflection element for the transmit path and the receive path may be compensated for.

According to some embodiments, the instrument may further comprise a deflection lens. An optical displacement due to the deflection element may then be converted to an optical deflection to produce angular deflection of the transmit path and/or the receive path across the instrument optical axis. The deflection lens (or deflection lens assembly) may be part of the deflection module or a separate entity. The deflection lens operates together with a deflection element of the deflection module to transform a motion of the deflection element into an angular deflection.

According to some embodiments, the deflection element may comprise at least one of a prism, a multi-faceted mirror, and a disk having a scalloped curving mirrored surface. The prism may have any number of faces and the multi-faceted mirror may have any number of facets. For exemplifying purposes only, the at least one deflection element may be a prism having six to ten faces distributed around an axis of rotation.

According to some embodiments, the time-dependent attenuation function may include a maximum of attenuation at a critical time elapsed since the emission time of the transmit light signal.

According to some embodiments, the critical time may be dependent on at least one geometrical parameter of an optical subsystem with which the return light signal is received at the receiver unit.

For example, the optical subsystem of the receiver unit may include a first aperture and a detection aperture. The critical time may then be dependent on at least one of the size of the first aperture, a size of the detection aperture and a distance from the first aperture to the detection aperture. It will be appreciated that an amount of light reaching the first aperture from the target may be described by a first function dependent on distance between the first aperture and the target, and an amount of light passing through the first aperture reaching the detection aperture without applied attenuation may be described by a second function dependent on distance between the first aperture and the target. As a result of the combination of these two functions, the return light signal reaches a maximum at a specific (or critical) distance from the instrument, which also corresponds to a critical time for the transmit light signal to travel from the transmitter unit of the instrument to the target and back from the target to the optical subsystem of the receiver unit of the instrument. As mentioned above, the attenuation may therefore be varied, as time passes, to reach after emission of the transmit light signal a maximum at a critical time elapsed since the emission time of the transmit light signal.

In particular, the critical time corresponds to a (critical) light travel distance (i.e. two times the distance between the instrument and the target) for which a maximum amount of light is obtained at a detection aperture of the optical subsystem. In other words, a maximum return light signal may be obtained for a specific position or distance of the target (at which the transmit light signal is reflected) to the instrument.

In some embodiments, the attenuation increases since the emission time of the transmit light signal up to the critical time. Thus, although the dependence of the intensity of the return light signal may be inversely proportional to the square of the distance between the target and the instrument (or inversely proportional to the travelling time of the transmit light signal between the target and the instrument), the intensity or power level of the return light signal (and thus the return electrical signal) may first increase up to a critical distance to reach a maximum. Thus, instead of decreasing the attenuation of the power of the return light signal (or the return electrical signal) directly after emission of the transmit light signal, the attenuation may be increased until the critical time is reached. For example, the critical time may be in the range of approximately 0.1 to 0.5 microseconds, which corresponds to a critical distance to the target of approximately 15 to 75 meters.

In some embodiments, the attenuator is configured such that the attenuation of at least one of the return light signal and the return electrical signal decreases after the critical time. Beyond the critical distance (i.e. for larger distances), the return light signal will be mainly affected as a function of the inverse of the square of the distance.

The critical time may be specific to a particular instrument and, more specifically, to the optics in the receiver unit of the instrument. In some embodiments, the apparatus may further comprise a calibration mode or working mode for determining the critical time during a calibration procedure. The calibration procedure may take place in factory or in the field and may be performed for a basic configuration of the optical subsystem. The calibration procedure may also be performed in the field in order to take into account any addition of optical elements in the optical subsystem or in the optical path of the return light signal as compared to the basic configuration, i.e. for any new configuration of the instrument.

It will be appreciated that a particular time-dependent attenuation function may be determined for each deflection angle. For a given instrument, the critical time at which a maximum in the function is reached may be equivalent or similar for the various time-dependent functions (i.e. for the various deflection angles), the attenuation level from one function to another (i.e. for one deflection angle to another) may vary.

Although it is herein described that for a certain deflection angle a time-dependent attenuation function including a maximum at a critical time may be applied, other types of time-dependent attenuation functions may be applied in accordance with other embodiments of the present disclosure.

The embodiments described herein provide for an improved compensation such that the optics-dependent variation of the power level of light received from a target is reduced.

In some embodiments, the transmit light signal comprises at least one light pulse. In some embodiments, the transmit light signal comprises multiple light pulses.

According to some embodiments, the measurement instrument may further comprise a front lens having an optical path along the instrument optical axis and the deflection module may be optically located between the front lens and at least one of the transmitter unit and the receiver unit.

In these embodiments, the deflection module may be inserted in the optical path between at least one of the transmitter unit and the receiver unit (or both such as e.g. with a distance measurement module including the transmitter unit and the receiver unit) of the measurement instrument and its front lens. The measurement instrument may be a total station such that, in a first mode, measurements may be performed with the deflection module being still wherein the instrument aims at a specific target by rotation/movement of at least some parts of its body such as its center unit or alidade. In this first mode, parts of the body of the instrument may be moved such that the instrument optical axis is directed towards the target. In a second mode, the measurement instrument may be operated to perform scanning of a scene (including e.g. a building) by deflecting a measurement path (i.e. one of the transmit path and the receive path or both) of the instrument across the instrument optical axis via the deflection module. The measurement instrument may therefore provide both for measurements as a total station, i.e. with the precision of a total station when performing distance measurement to a specific target, and for scanning of a scene with measurements performed at a repetition rate similar to that of a geodetic scanner.

It will be appreciated that the measurement instrument may comprise a center unit, an alidade, and a base, wherein the transmitter unit and the receiver unit may be located in the center unit. The center unit may be mounted on the alidade for rotation about a first axis, and the alidade may be mounted on the base for rotation about a second axis intersecting (e.g. orthogonal to) the first axis, such that the instrument optical axis is rotatable about a rotation point.

In general, the front lens (or front lens assembly) may be, in the transmit path, the last optical element (or group/assembly) with a certain refractive property or effect (e.g. a diverging/converging lens) at which, or after which, the measurement beam exits (or leaves) the measurement instrument. Analogously, the front lens is the first optical element (or group/assembly) with a certain refractive property (e.g.

a diverging/converging lens) which the measurement beam meets when entering, or after having entered, the measurement instrument.

In some other embodiments, the measurement instrument may be a geodetic scanner and the deflection module, such as a rotating mirror, may be the last optical element at which the measurement beam exits the geodetic scanner. Analogously, in this example, the deflection module is the first optical element which the measurement beam meets when entering the instrument.

According to some embodiments, the measurement instrument may be configured to regulate the attenuation of the attenuator for a travelling transmit light signal, as time passes, from a time event related to the emission of the travelling transmit light signal until reception of the return light signal corresponding to the travelling transmit light signal. Alternatively, the measurement instrument may be configured to regulate the attenuation of the attenuator until emission of a subsequent transmit light signal or until a time period elapsed since the emission time (or a time event related to the emission of the travelling transmit light signal) exceeds a threshold. The time event may be the emission of the light pulse itself but may also be the reception of a reference pulse or another signal related to the emission of the light pulse, such as part of the light pulse being reflected in another direction than towards the target.

The attenuator may for example be regulated for a travelling light pulse from the time it is emitted until it returns for measurement of the distance associated with this specific light pulse using the time-dependent attenuation function corresponding to the deflection angle with which the light pulse has been emitted.

For this purpose, the measurement instrument may include a controller adapted to regulate the attenuation of the attenuator as a function of time. More specifically, the controller may cause an attenuation control signal generator to produce time-dependent attenuation control signals using the time-dependent attenuation function. The attenuation control signals may be related in time to the emission time.

In the context of the present application, the wording distance measurement instrument may be interchangeably replaced with the terms total station, survey unit, surveying instrument, apparatus, or geodetic instrument and vice versa. The present disclosure aims at providing at least some embodiments of a measurement instrument with improved detection sensitivity (i.e. with improved attenuation) for scanning purposes. At least some of the embodiments aim at providing a surveying instrument primarily functioning as a total station, i.e. with the characteristic and the structure of a total station, but equipped with elements, and in particular a deflection module, for providing a scanning function such as obtained with a geodetic scanner.

The present disclosure relates to all possible combinations of features recited in the claims and in the preceding embodiments. Further objects and advantages of the various embodiments of the present disclosure will be described below by means of exemplifying embodiments.

BRIEF DESCRIPTION OF DRAWING FIGURES

These and other aspects and features of the present disclosure will be more readily understood from the embodiments described below with reference to the drawings, in which:

FIG. 1 schematically illustrates a scenario of a scanner on a tripod taking measurements of a scene;

FIG. 2A, FIG. 2B and FIG. 2C schematically illustrate a measurement instrument in accordance with some embodiments;

FIG. 3 is a schematic diagram of an EDM subsystem in accordance with some embodiments;

FIG. 4 schematically illustrates a measurement instrument in accordance with an embodiment;

FIG. 5 schematically illustrates a distance measurement system in accordance with some embodiments;

FIG. 6 shows a timing diagram of a distance measurement in accordance with some embodiments;

FIGS. 7A-C schematically illustrate an example of the return light signal from a target at three different distances;

Figure 10:
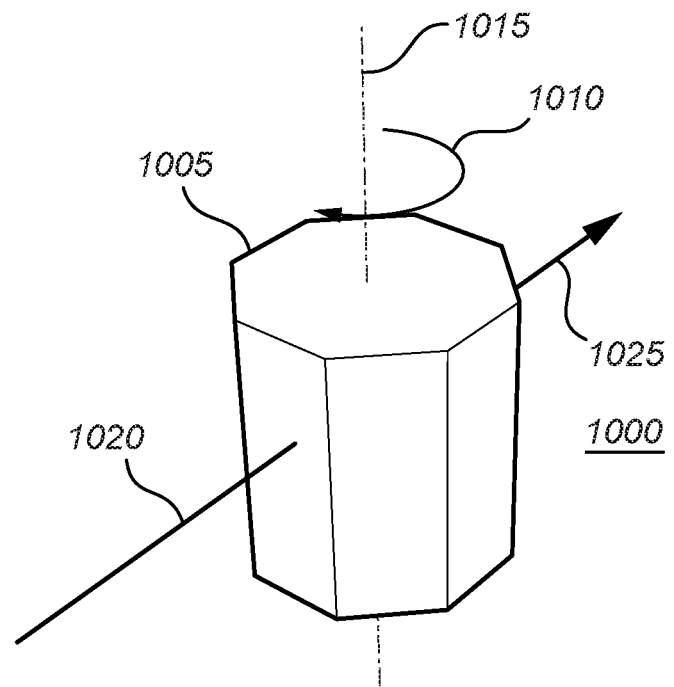
FIG. 10 illustrates a deflection element in accordance with some embodiments.
Figure 12A:
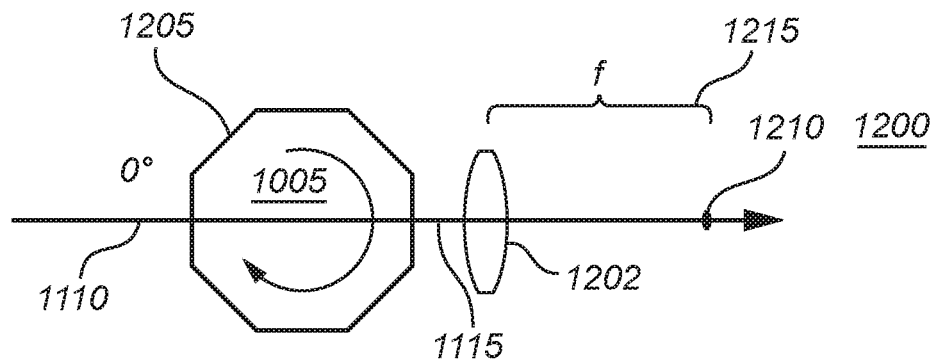
Figure 12B:
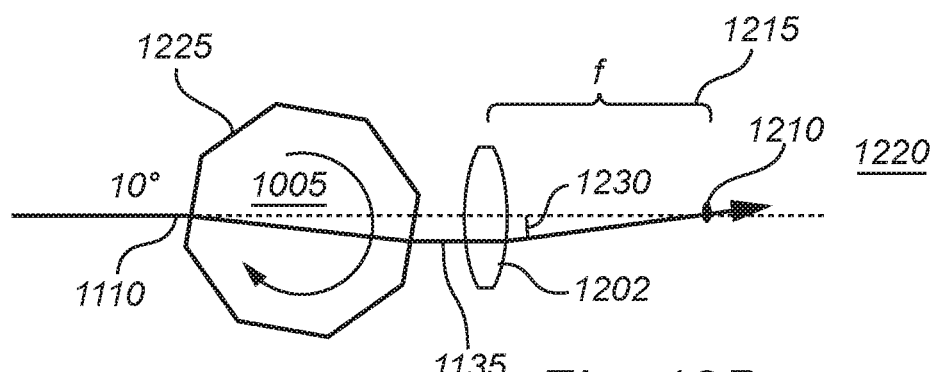
Figure 12C:
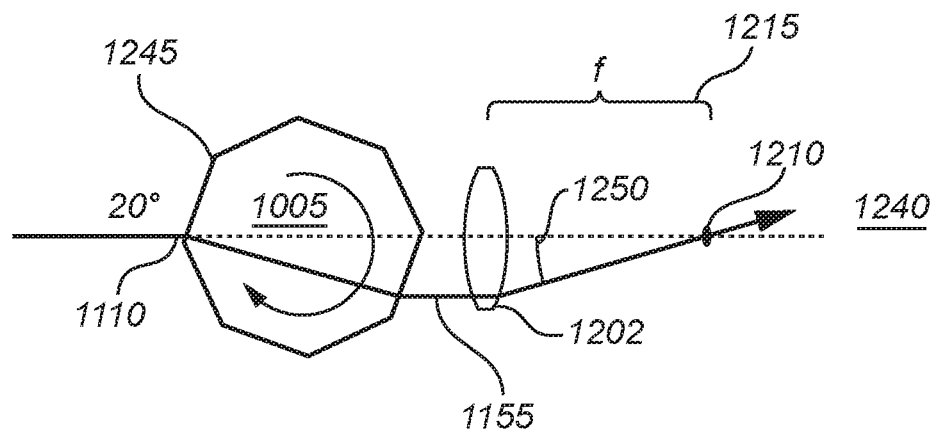
Figure 13:
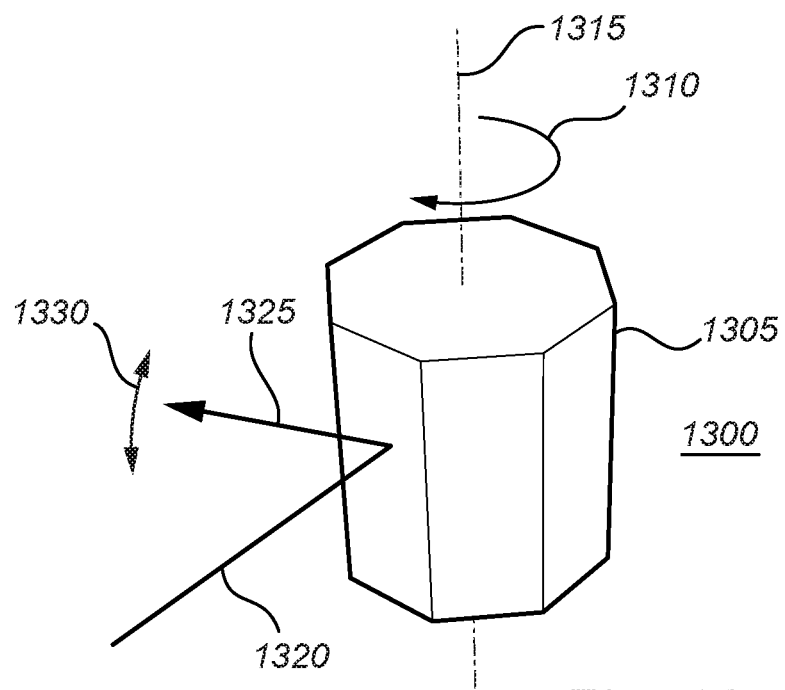
Figure 14:
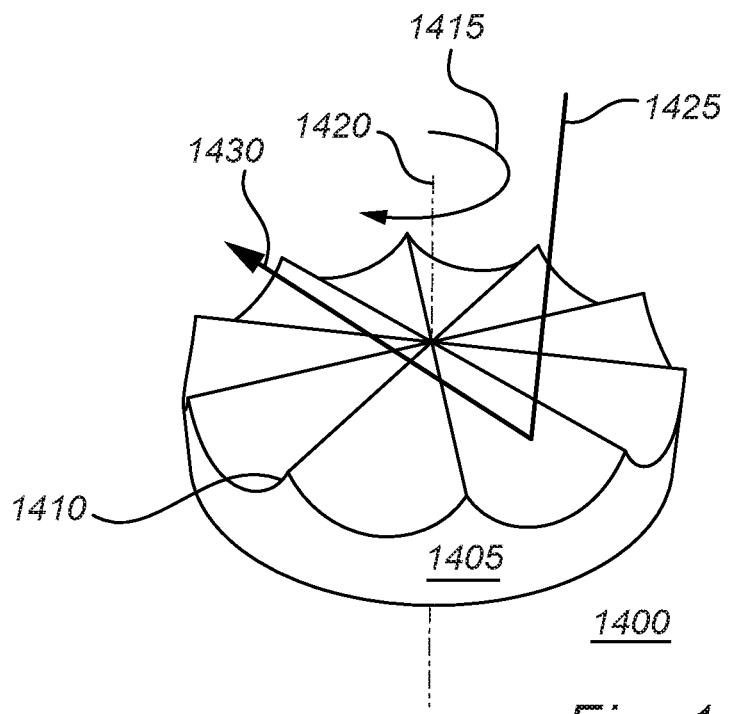
Figure 15A:
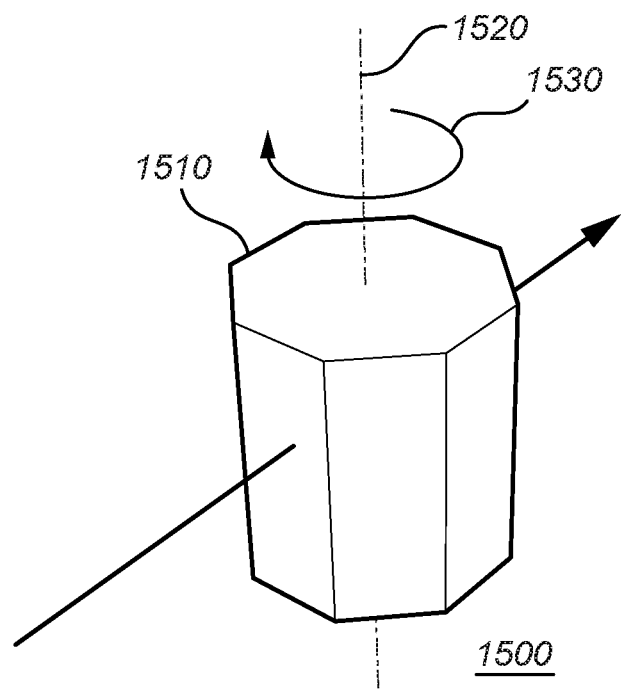
Figure 15B:
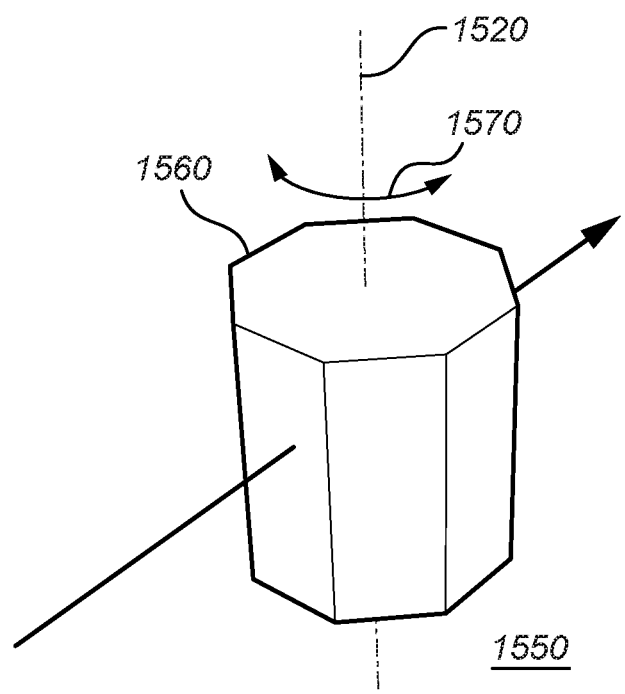
Figure 16A:
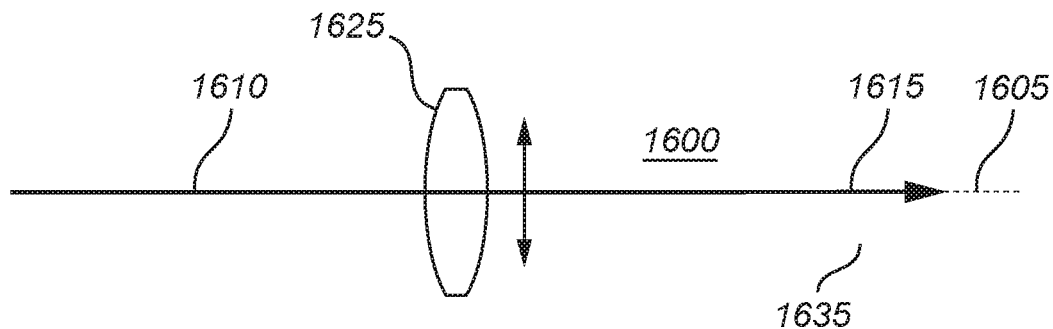
Figure 16B:
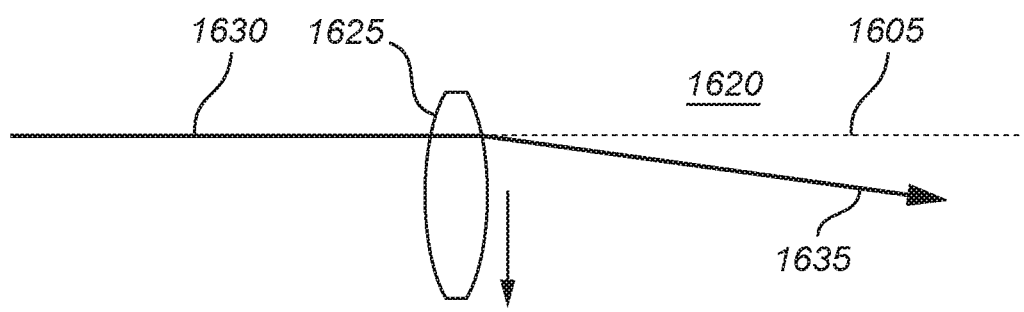
Figure 16C:
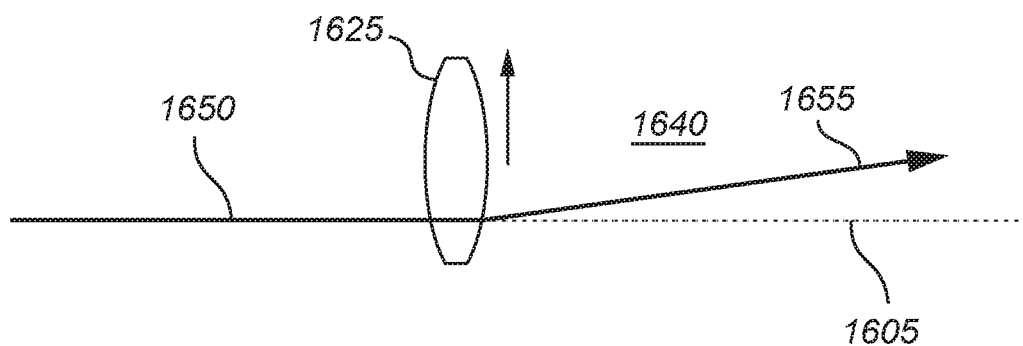
Figure 17A:
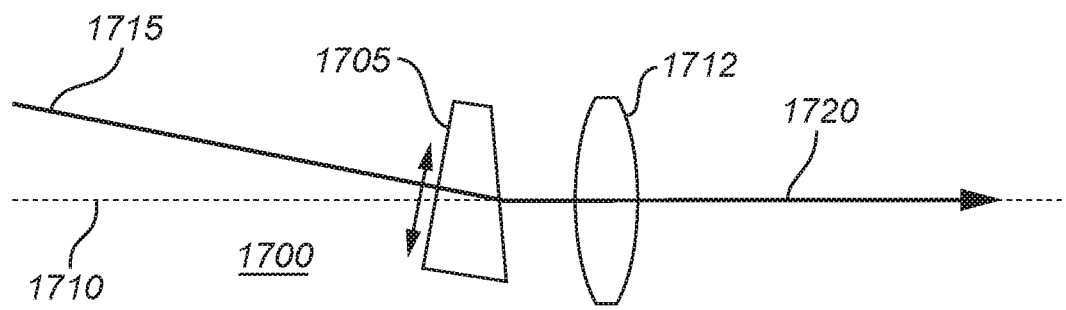
Figure 17B:
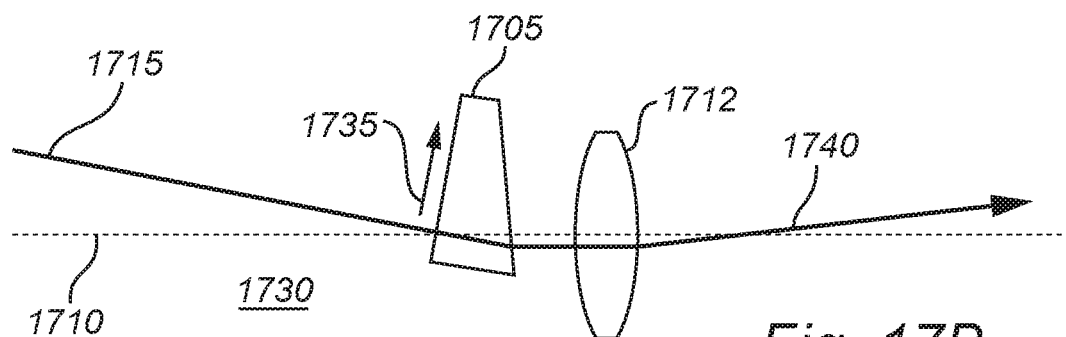
Figure 17C:
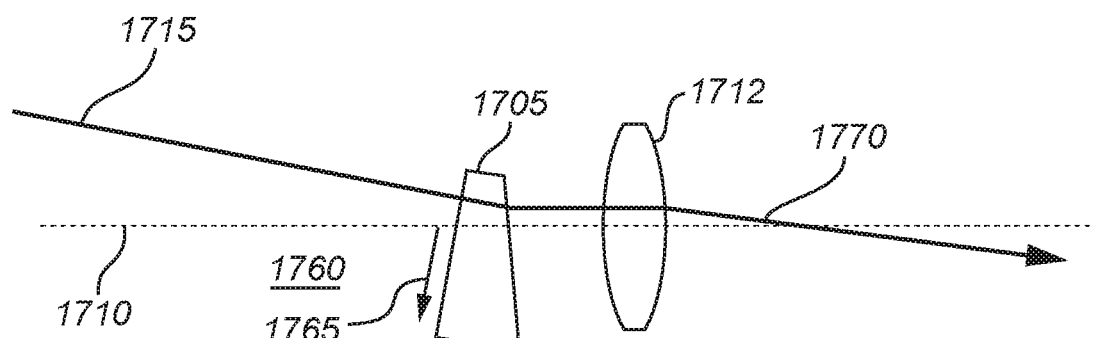
Figure 18:
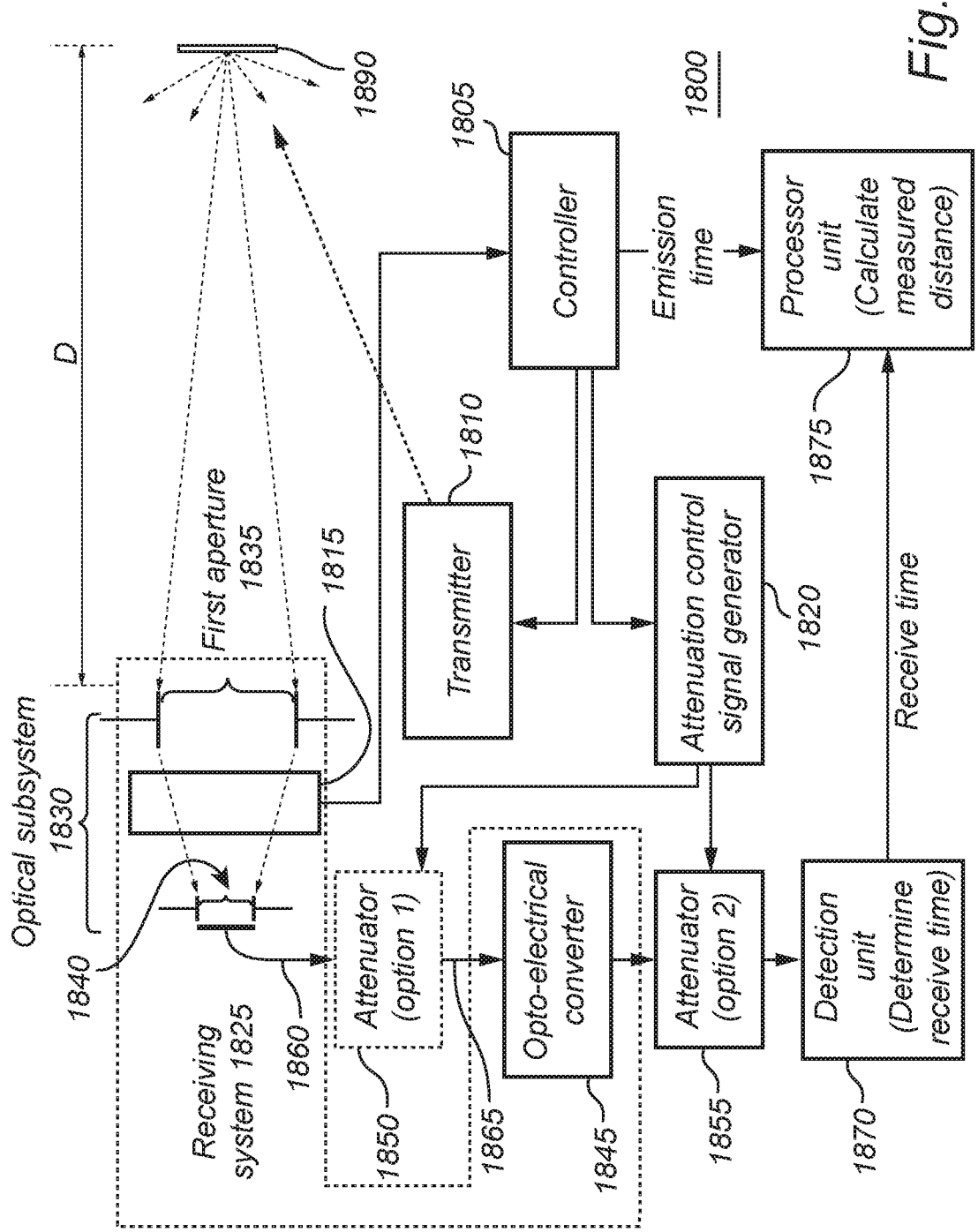
Figure 19A:
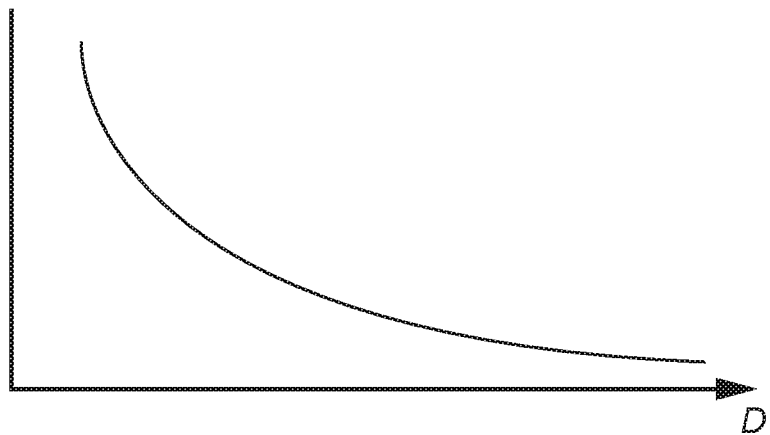
Figure 19B:
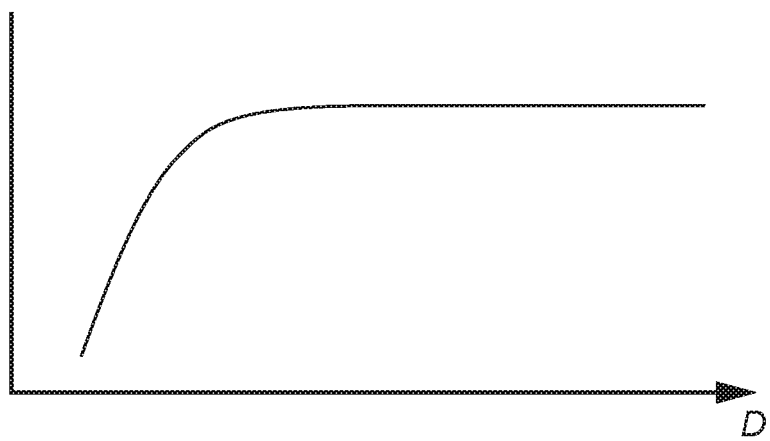
Figure 20A:
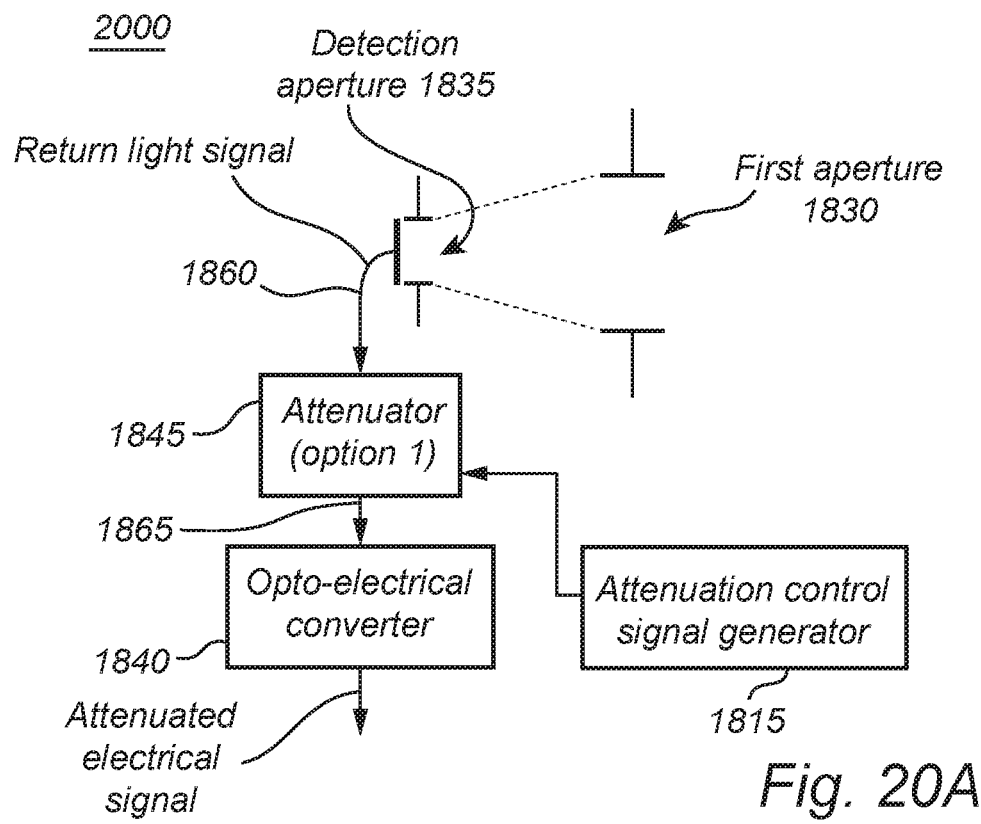
Figure 20B:
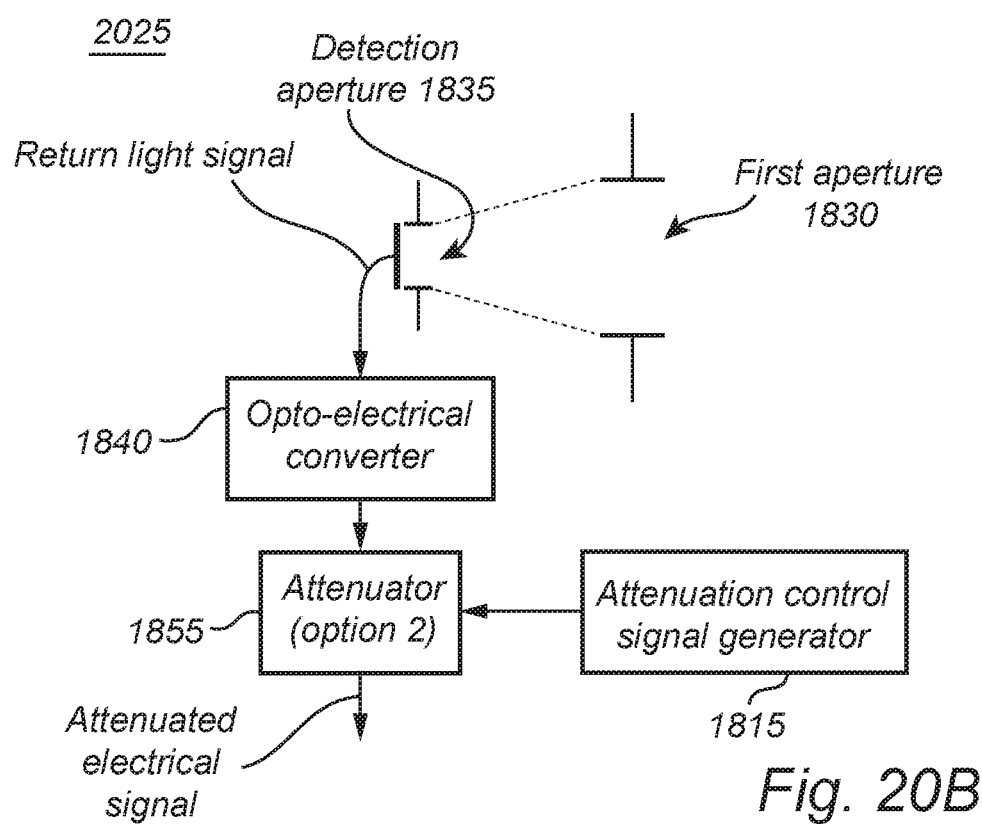
Figure 20C:
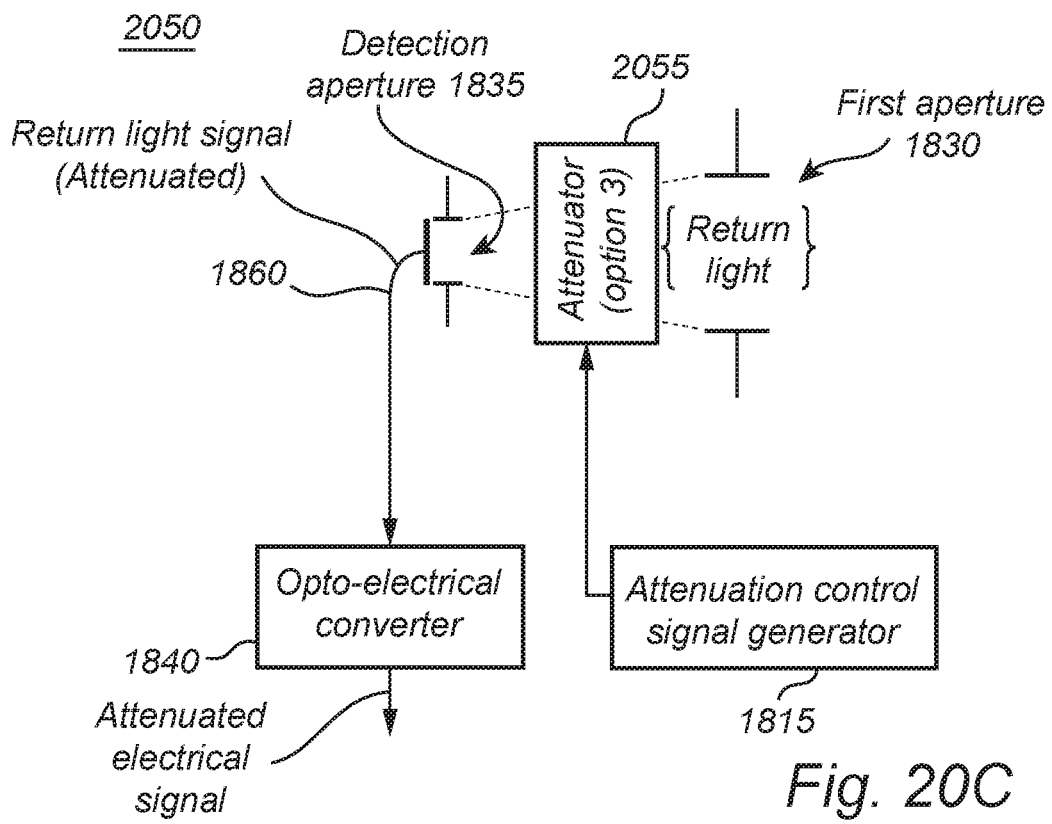
Figure 20D:
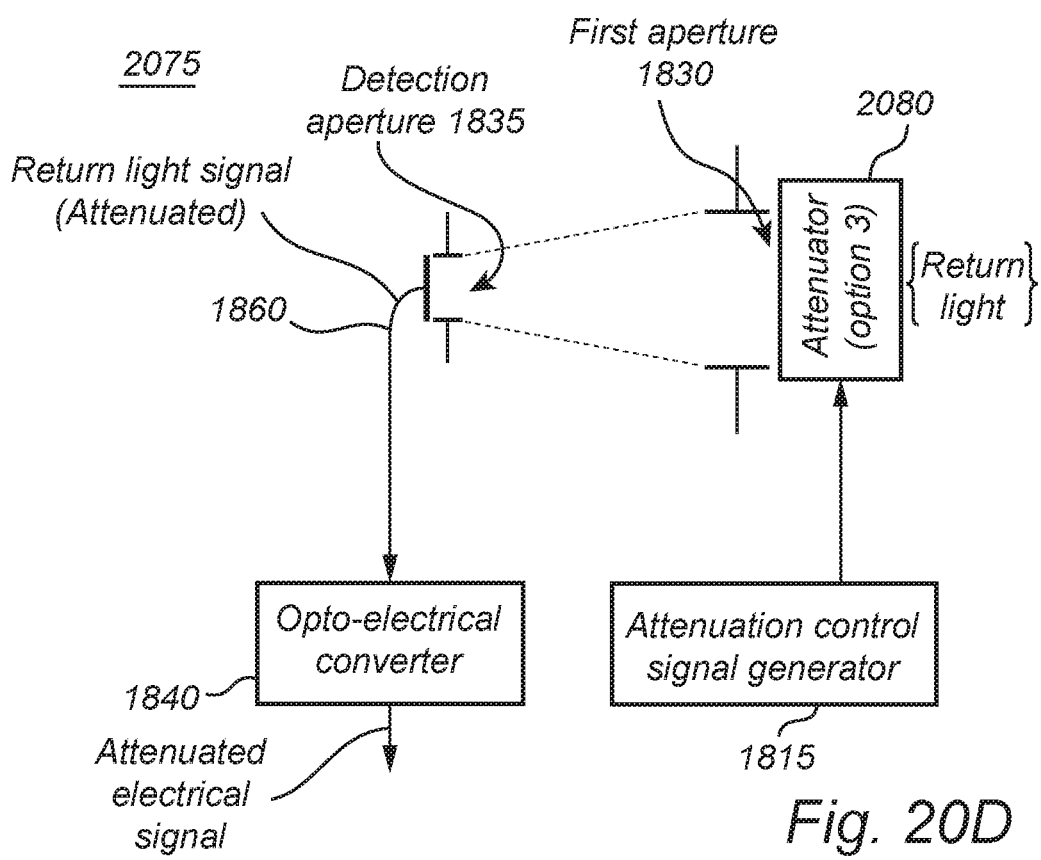
Figure 21:
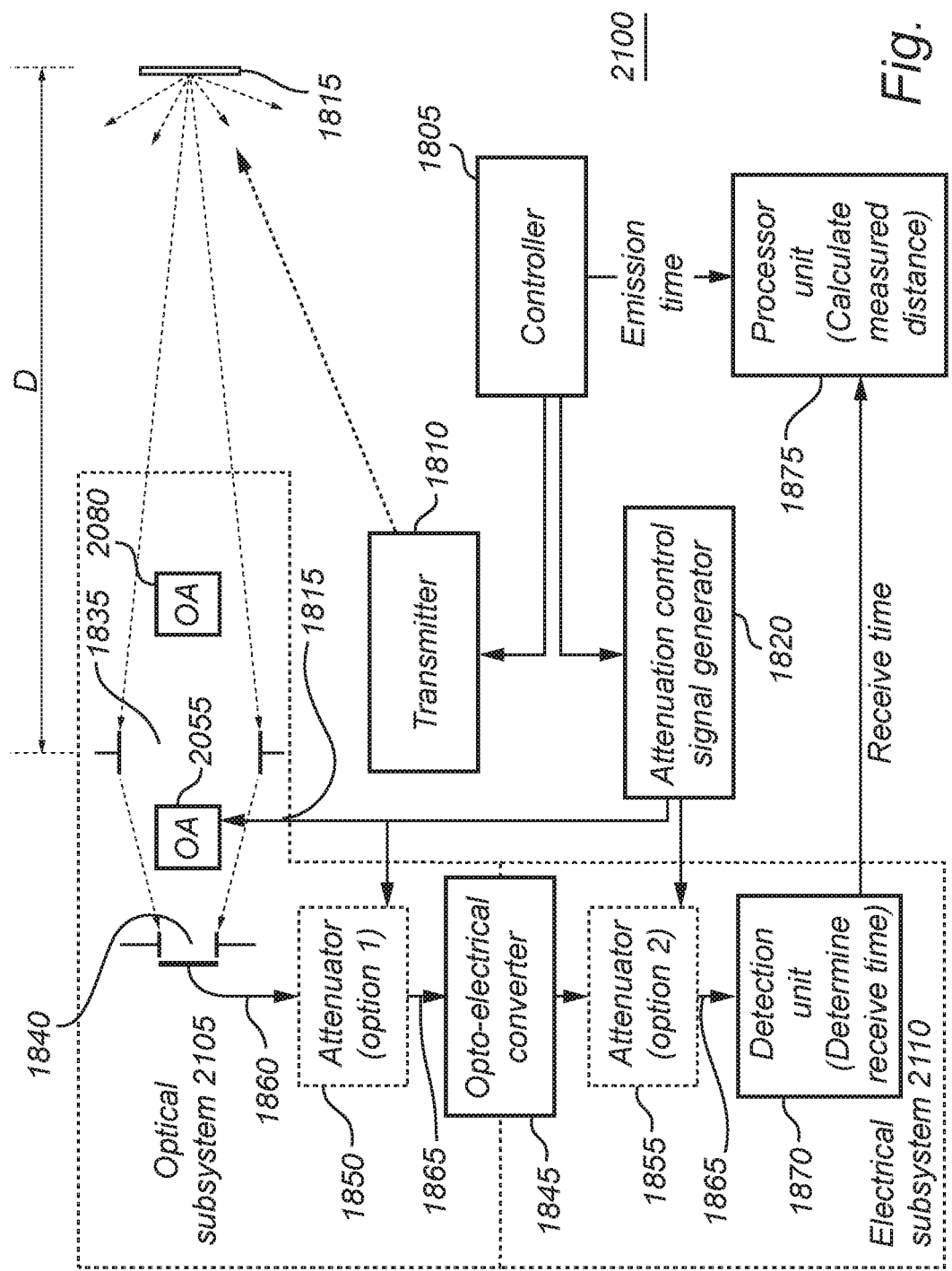
Figure 22:
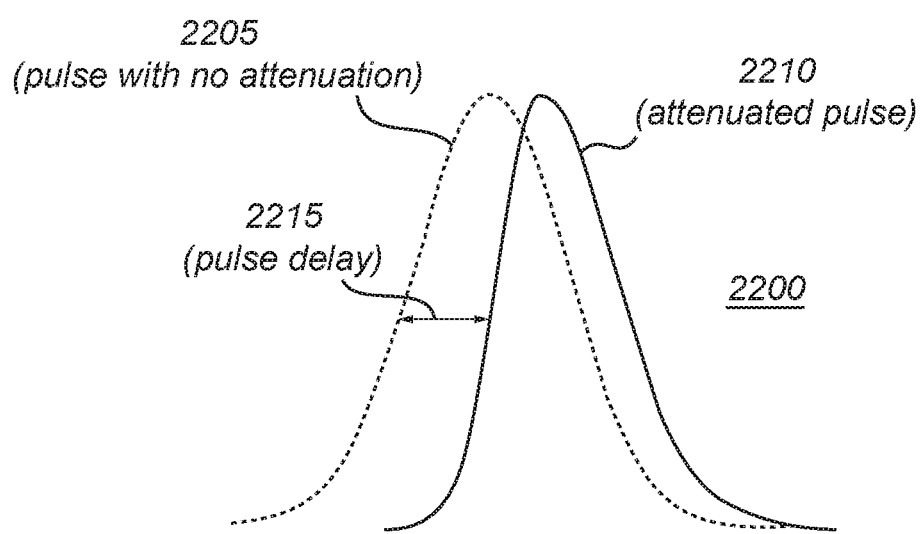
Figure 23:
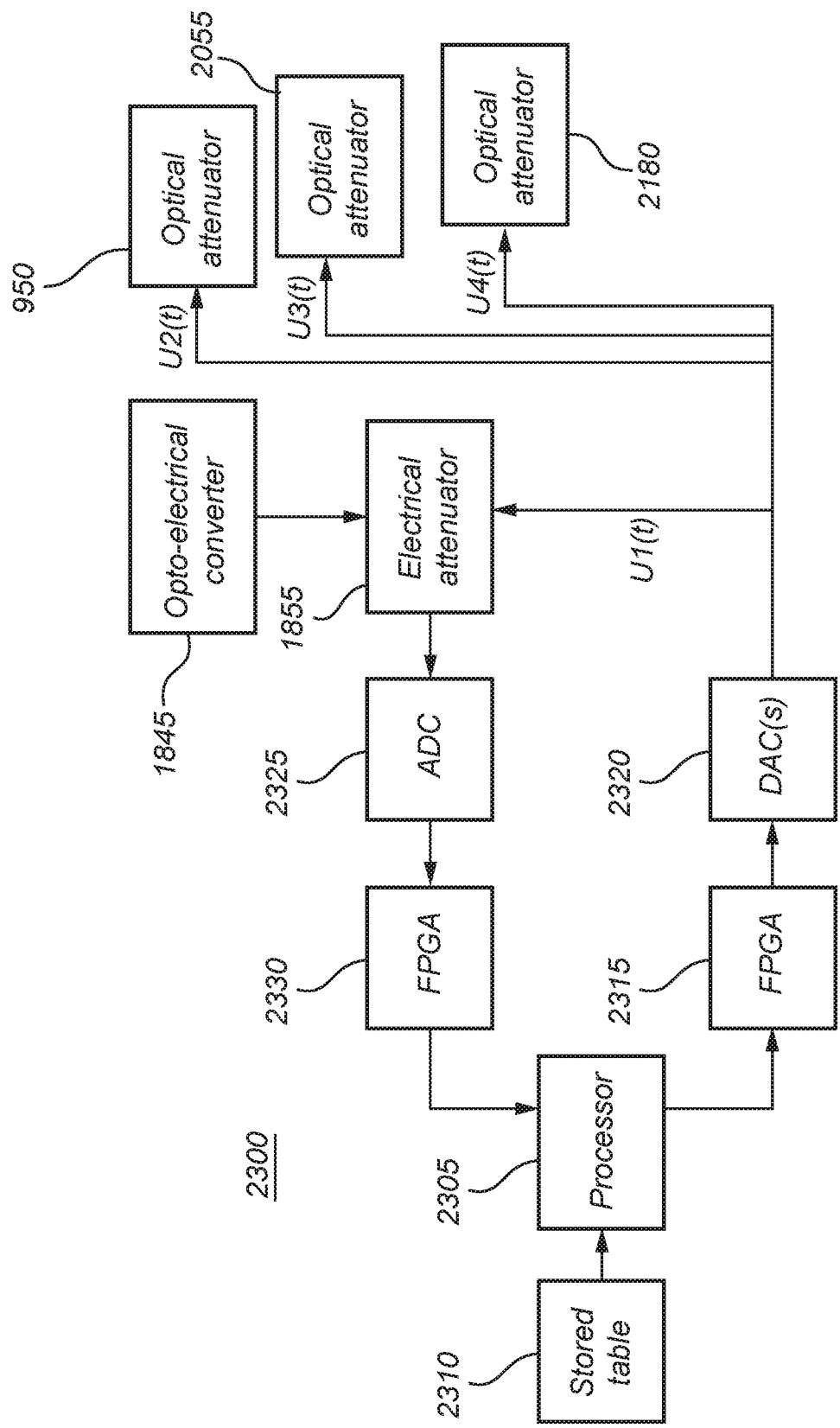
Figure 24A:
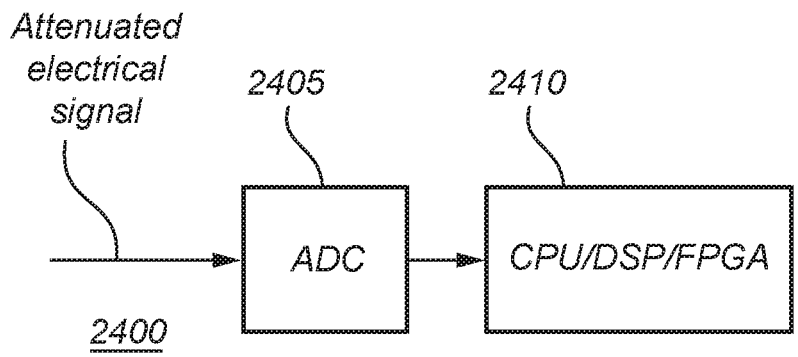
Figure 24B:
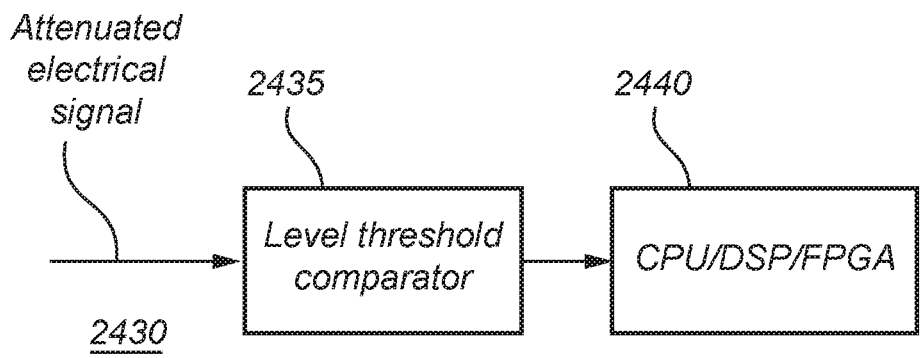
Figure 24C:
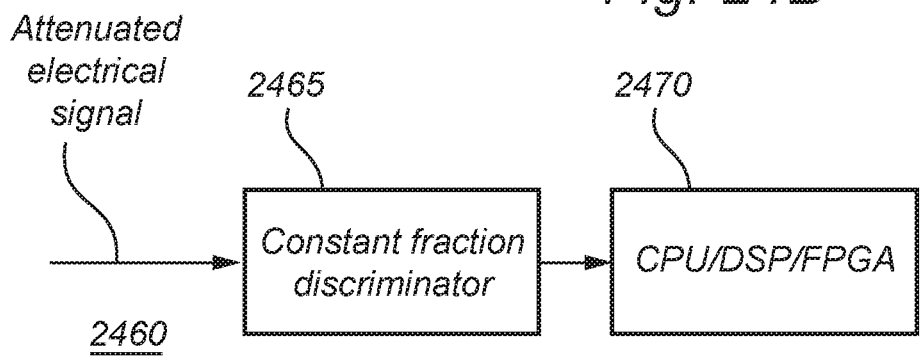
Figure 25:
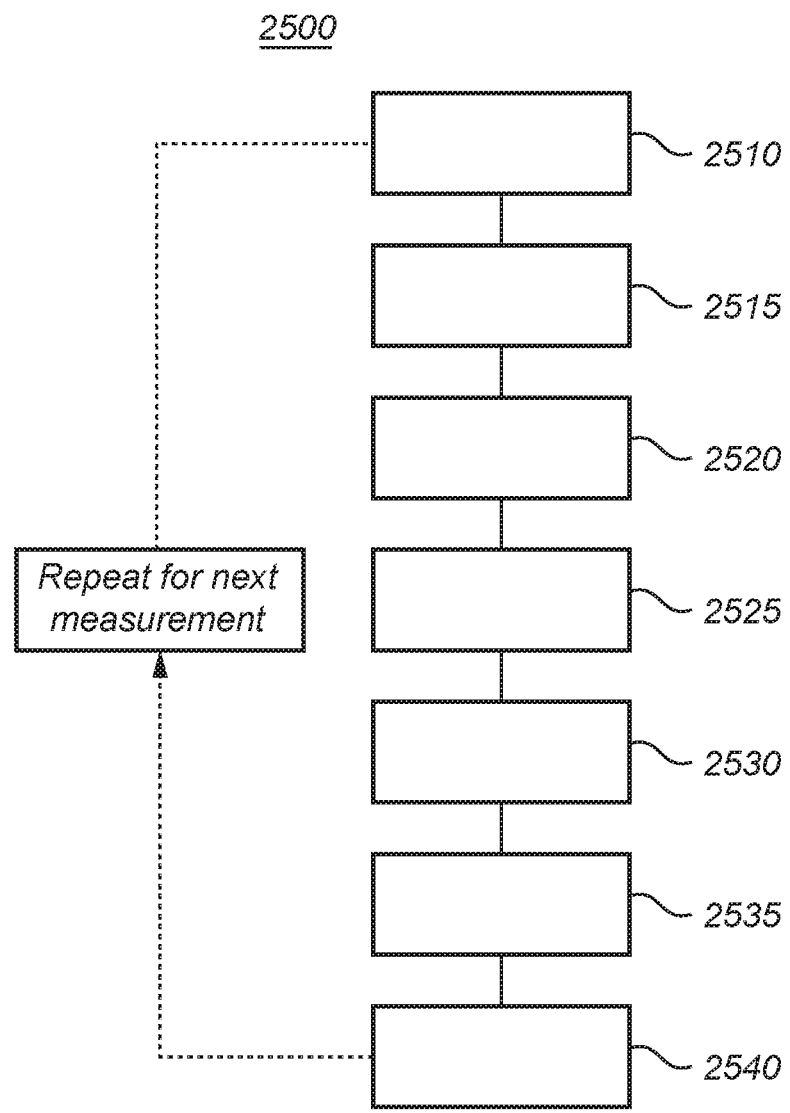

FIGS. 11A-E show the beam path with the deflection element of FIG. 10 at a zero-degree rotation angle, a ten-degree rotation angle, a twenty-degree rotation angle, a twenty-five-degree rotation angle and a thirty-five-degree rotation angle, respectively;

FIGS. 12A-C show the beam path with the deflection element of FIG. 10 at a zero-degree rotation angle, a ten-degree rotation angle and a twenty-degree rotation angle, respectively, in relation to a front lens assembly;

FIG. 13 shows a further example of a deflection element in accordance with some embodiments;

FIG. 14 shows a further example of a deflection element in accordance with some embodiments;

FIG. 15A shows a deflection element rotating about an axis in accordance with some embodiments;

FIG. 15B shows a deflection element oscillating about an axis in accordance with some embodiments;

FIG. 16A, FIG. 16B and FIG. 16C show deflection of a beam path with linear motion of a deflection element in accordance with some embodiments;

FIG. 17A, FIG. 17B and FIG. 17C show the effect of a final lens assembly on a beam path that is deflected by an optical wedge in accordance with some embodiments;

FIG. 18 shows a schematic diagram of an apparatus for measuring distance in accordance with some embodiments;

FIG. 19A shows an example of a first function relating the amount of light reaching the first aperture of FIG. 18 to distance D between the first aperture and a target;

FIG. 19B shows an example of a second function relating the amount of light passing through the first aperture and reaching the detection aperture of FIG. 18 to distance D between the first aperture and a target;

FIG. 20A shows a first attenuation configuration in accordance with an embodiment;

FIG. 20B shows a second attenuation configuration in accordance with an embodiment;

FIG. 20C shows a third attenuation configuration in accordance with an embodiment;

FIG. 20D shows a fourth attenuation configuration in accordance with an embodiment;

FIG. 21 shows a schematic diagram of an apparatus for measuring distance in accordance with some embodiments;

FIG. 22 illustrates distortion in the attenuated electrical signal due to applied attenuation;

FIG. 23 is a schematic diagram of the electronics portion of a receiving system in accordance with some embodiments;

FIGS. 24A-C show examples of detection units in accordance with some embodiments; and FIG. 25 shows a flow chart of a method of operating a distance measuring system in accordance with some embodiments of the invention.

As illustrated in the figures, the sizes of the elements and regions may be exaggerated for illustrative purposes and, thus, are provided to illustrate the general structures of the embodiments. Like reference numerals refer to like elements throughout.

DETAILED DESCRIPTION

The present invention will now be described more fully hereinafter with reference to the accompanying drawings, in which exemplifying embodiments are shown. The invention may however be embodied in many different forms and should not be construed as limited to the embodiments set forth herein, these embodiments are rather provided by way of examples.

Figure 1:
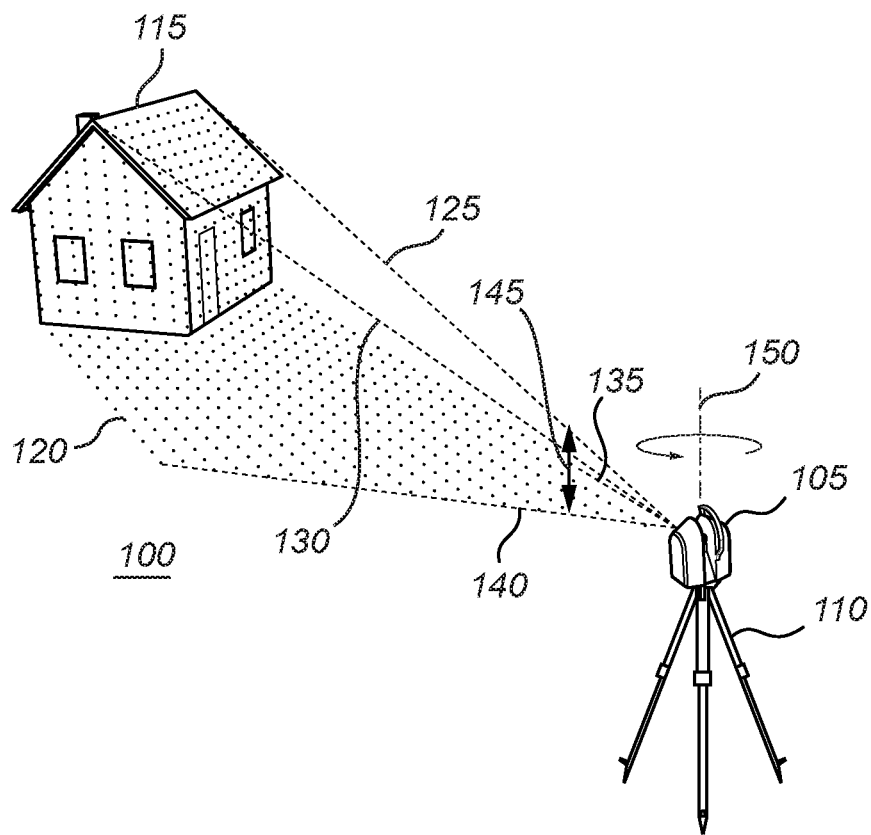

FIG. 1 schematically illustrates a scenario 100 of a 3D laser scanner 105 mounted on a tripod 110 for taking measurements of a scene such as a building 115 and surroundings 120 to obtain a 3D cloud of measured points over vertical and azimuthal angular limits indicated by dashed lines 125, 130, 135, 140. The scanner 105 typically has a rotating mirror as deflection module to scan the optical axis of the instrument (i.e. the EDM axis) at a high speed in a vertical direction 145. The rotating mirror is mounted on a scan head rotating azimuthally about an axis 150 at low speed.

The EDM of the scanner 105 is free-running at a high repetition rate. The elevation and azimuth of the scan head and the deflection angle provided by the deflection module are recorded along with each distance measurement.

For each location of a scene to be scanned, a transmit light signal is emitted by the scanner toward the location in question along a transmit path at an emission time and a return light signal is received at the scanner along a receive path at a receive time. The return light signal may then be converted to a return electrical signal. A distance from the scanner to the location may be determined based on time-of-flight using at least the emission time and the receive time. For orienting the transmit light signal to a specific location at least one of the transmit path and the receive path is deflected with a deflection angle relative to an optical axis of the scanner.

As will be further explained in more detail in the following, a time-dependent function for attenuation of one of the return light signal and the return electrical signal may be applied for improving the detection sensitivity at the scanner. The time-dependent function may be selected based on information relative to the deflection angle.

Figure 2A:
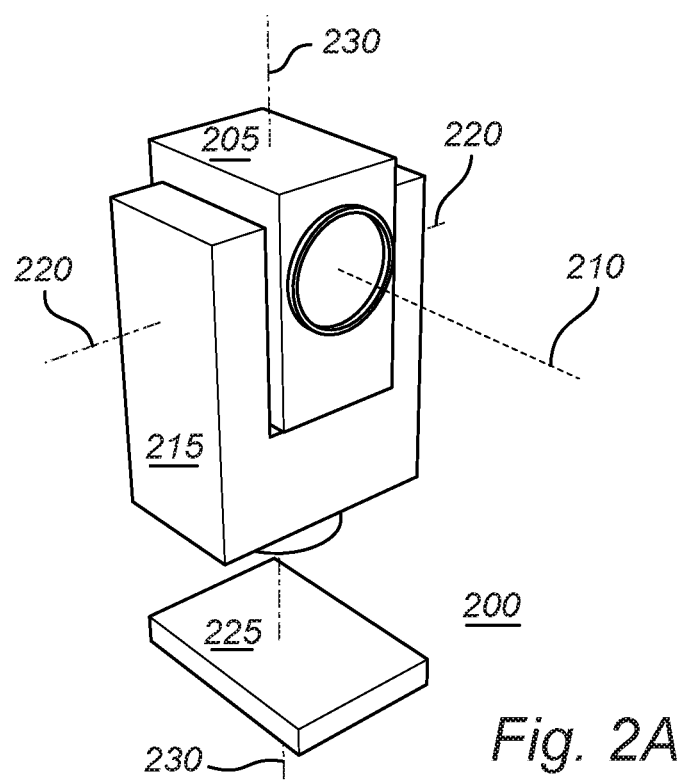

FIG. 2A schematically illustrates a measurement instrument 200 in accordance with some embodiments. The instrument 200 includes a center unit 205, such as a telescope assembly, having an instrument optical axis 210. The telescope assembly 205 is mounted for rotation about two axes: on a trunnion of an alidade 215 for rotation about a first (trunnion) axis 220, and on a base 225 for rotation about a second (azimuthal) axis 230.

FIG. 2B shows the instrument of FIG. 2A with the alidade 215 in phantom lines to reveal the trunnion 245 defining the trunnion axis 220. Rotation of the telescope assembly 205 about the trunnion axis 220 is indicated by arrow 250. Rotation of the alidade 215 about the azimuthal axis 230 is indicated by arrow 255.

As illustrated in FIG. 2C, the instrument may further include a deflection module 255 such that a measurement beam of an electronic distance measurement (EDM) module 275, nominally aligned with the optical axis 210, is deflectable about a third axis of rotation 235 as indicated by arrow 240. FIG. 2C shows an optical path extending from the EDM 275 to the deflection module 255 at which it is deflected. The EDM 275 and the deflection module 255 may for example be arranged within the center unit 205 of the measurement instrument.

Figure 3:
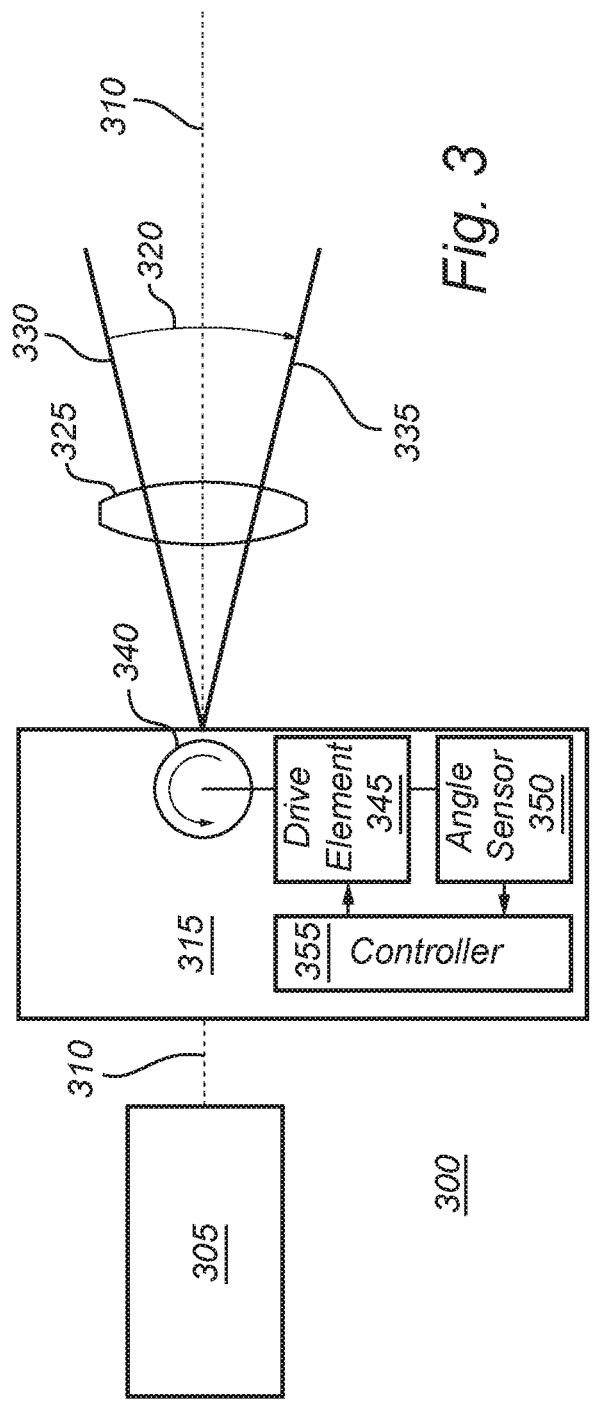

FIG. 3 is a schematic diagram of an electronic distance measurement (EDM) subsystem 300 in accordance with some embodiments. A distance measurement module 305 transmits optical radiation along a transmit path and receives optical radiation along a receive path. In FIG. 3, the transmit path and the receive path between the EDM 305 and the deflection module 315 are superposed with the optical axis 310 of the EDM subsystem 300. A deflection module 315 deflects at least one of the transmit path and the receive path across the instrument optical axis 310. The deflection is indicated by arrow 320. In this example, the deflection module 315 is located behind a front lens assembly 325. Angular deflection limits are indicated at 330 and 335.

In FIG. 3, the optical axis of the EDM is denoted 310. Although the transmit path and the receive path (i.e. optical radiation to and from the EDM) are represented to be superposed between the EDM 305 and the deflection module 315 in FIG. 3, it will be appreciated that the EDM may comprise, on the one hand, a laser source for transmission of an optical radiation and, on the other hand, a detector (or receiver) for detecting optical radiation reflected at a target or any object (or surroundings) towards which the optical radiation has been transmitted from the laser source via the deflection module 315 and the front lens assembly 325. The laser source and the detector may be two separate entities arranged at two different locations in the EDM 305 and, thus, the transmit path and the receive path may be distinct and separated within the EDM 305. Alternatively, although not represented as such in FIG. 3, the transmit path and the receive path may be separated between the deflection module 315 and the EDM 305.

FIG. 3 illustrates also that the deflection module may include at least one deflection element 340 to deflect at least one of the transmit path and the receive path as it rotates or moves. The deflection element 340 may be rotated or displaced (e.g. translated) by a drive element 345. In some embodiments, the drive element 345 may produce oscillating rotational motion of the deflection element 340. In some embodiments, the drive element 345 may produce continuous rotational motion of the deflection element 340. In some embodiments, the drive element 345 may produce directed rotational motion of the deflection element 340 to a selected orientation. The drive element 345 may for example be a motor having substantially constant rotational speed, a three-phase motor, a direct-current motor or a piezoelectric element.

FIG. 3 illustrates also that the measurement instrument may include an angle sensor 350 for measuring a rotation angle of the deflection element 340 or another kind of sensor for measuring a translational displacement of the deflection element 340. In some embodiments, the sensor 350 may be operative to detect an angle of rotation of the deflection element 340 relative to the optical axis 310. Alternatively, a displacement sensor may be configured to detect a translational displacement of the deflection element 340 relative to the optical axis 310. In some embodiments, the angle sensor 350 may be an angle encoder.

The EDM subsystem 300 may also include a drive controller 355 in communication with the drive element 345 and the angle sensor 350 for controlling rotational motion (and/or a translational displacement) of the deflection element 340 by the drive element 345. The drive controller 355 may be responsive to the angle sensor 350 (or a displacement/motion sensor) to control the drive element 345 in dependence upon a rotation angle of the deflection element 340 (or a translational displacement of the deflection element 340).

The subsystem 300 described with reference to FIG. 3 may be mounted within the center unit 205 of a total station 200 as described with reference to FIGS. 2A-C with the optical axis of the instrument 210 aligned with the optical axis 310 of the subsystem 300. Accordingly, a total station with a deflection module 315 arranged within its center unit is provided. Such a measurement instrument or total station may provide both for measurements to a specific target according to a first mode with the precision of a total station and for scanning of a scene according to a second mode with the speed of a geodetic scanner.

As will be further explained in more detail in the following, a time-dependent function for attenuation of one of the return light signal and the return electrical signal may be applied for improving the detection sensitivity at the measurement instrument. The time-dependent function may be selected based on information relative to the deflection angle.

Figure 4:
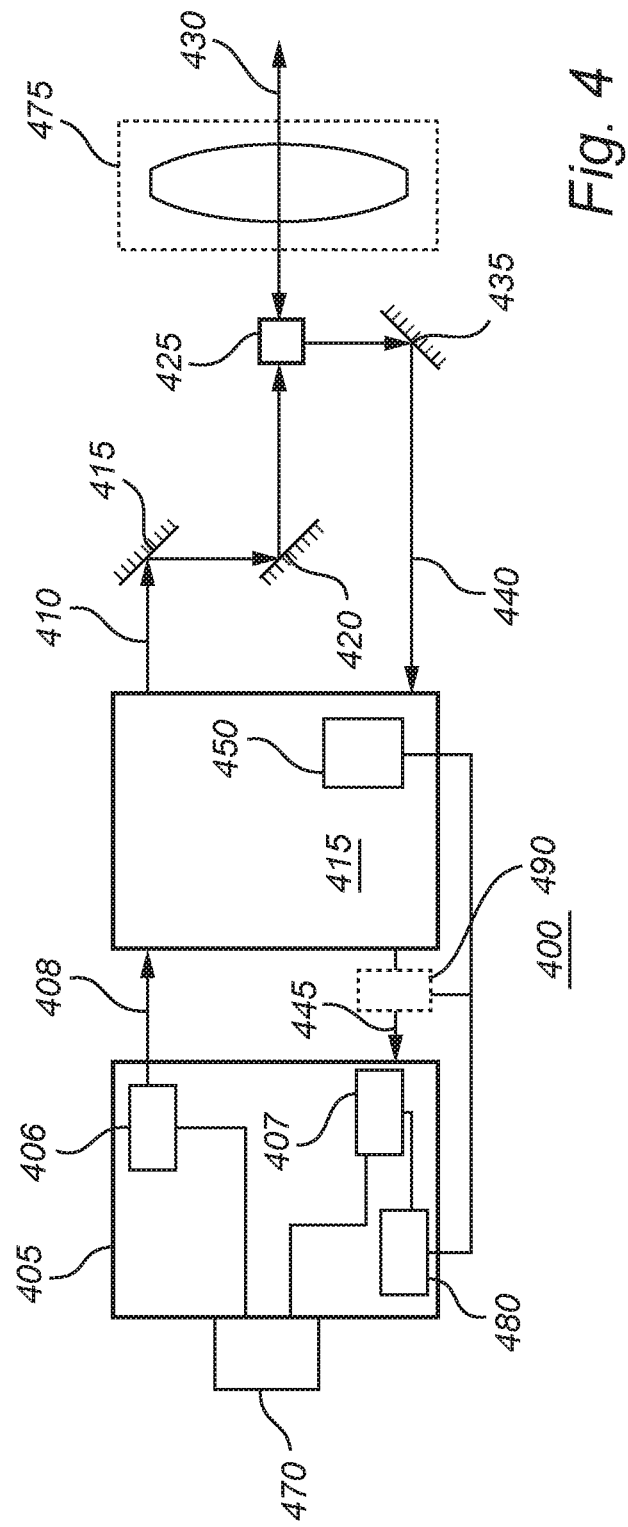

FIG. 4 schematically illustrates a measuring instrument 400 according to an embodiment having separate transmit path and receive path. The transmit path and the receive path may be separated by a splitter (or mixer) 425 at which the transmit path and the receive path are merged to form a measurement beam along an optical path 430. A transmit path extends from a transmitter 406 of an EDM 405 along a path 408 to a deflection module 415, then with deflection along a path 410 via optional mirrors 415 and 420 to the splitter 425, then via a front lens assembly 475 along a path 430. A receive path extends from the path 430 through the front lens assembly 425 to the splitter 425, then via a mirror 435 along a path 440 to the deflection module 415, then as deflected along a path 445 to the EDM 405. The mirrors are shown by way of example; mirrors may be placed in the transmit path and/or in the receive path or in neither as a matter of design choice. Without any mirror, the transmit path and the receive path would follow different directions, e.g. two directions perpendicular to each other as defined by the optical property of the splitter 425. In some embodiments, it could therefore be envisaged that the deflection module comprises two deflection elements, one arranged in the transmit path and one arranged in the receive path. The transmitter and the receiver of the EDM could also be arranged separately from each other.

The transmit path segment from the splitter 425 through the front lens assembly 475 along path 430 to a target overlaps with the receive path segment from the target along the path 430 through the front lens assembly 475 to the splitter 425. The combination of these overlapping segments of the transmit path and the receive path forms a measurement beam.

The deflection module 415 shown in FIG. 4 may be equivalent to the deflection module 315 described with reference to FIG. 3. In particular, the deflection module 415 may include a sensor 450 such as an angle sensor for measuring the angle of rotation of a deflection element of the deflection module, i.e. information relating to the deflection angle at which either one of the transmit path 410 and/or the receive path 440 is deflected. The measurement of the angle sensor 450 may be used for controlling either one of an optical attenuator 490 or an electronic attenuator 480 to compensate for the optical influence of the deflection module on the power level of the transmit signal along the path 410 and/or the receive signal along the receive paths 440, 445. In particular, the measurement of the angle sensor 450 may be used to select a time-dependent attenuation function to be applied to at least one of the attenuators 480, 490 since the power level of the receive signal is dependent on the deflection angle at which the receive path and/or the transmit path is deflected, i.e. dependent on the orientation and/or configuration of the deflection module 415. Accordingly, for a transmit light signal, e.g. a light pulse, transmitted at a certain deflection angle as measured by the angle sensor 450, a time-dependent attenuation function corresponding to (or adapted to) this deflection angle is applied to at least one of the attenuators 480, 490.

Although not represented in FIG. 4, the measurement instrument 400 may include a controller for receiving information relating to the deflection angle from the angle sensor 450 and for communicating with the attenuators 480, 490 such that a suitable time-dependent attenuation function is applied. Such a controller will be described with reference to FIG. 5. Alternatively, the information may be directly sent from the angle sensor to the attenuators 480, 490.

Rather than transmitting an angle of rotation or a detected translational displacement, the controller (or the attenuator itself) may obtain information about a starting position of the deflection element relative to the instrument optical axis and at least one of a rotation speed, a translation speed, and a displacement profile of the deflection element such that the various deflection angles or positions of the deflection element may be computed.

FIG. 4 illustrates also that the measurement instrument 400 may include a processor 470 in communication with the transmitter 406 for obtaining an emission time (or a time related to the emission time) at which a light pulse is emitted from the transmitter 406 and with the receiver 407 for obtaining a receive time (or time related to the receive time) at which a reflected light pulse is received at the receiver. Via the attenuation applied to the received light pulse, the determination of the receive time is more accurate. The processor may then calculate a distance from the measurement instrument to a target at which the transmitted light pulse has been reflected using the emission time and the receive time.

Figure 5:
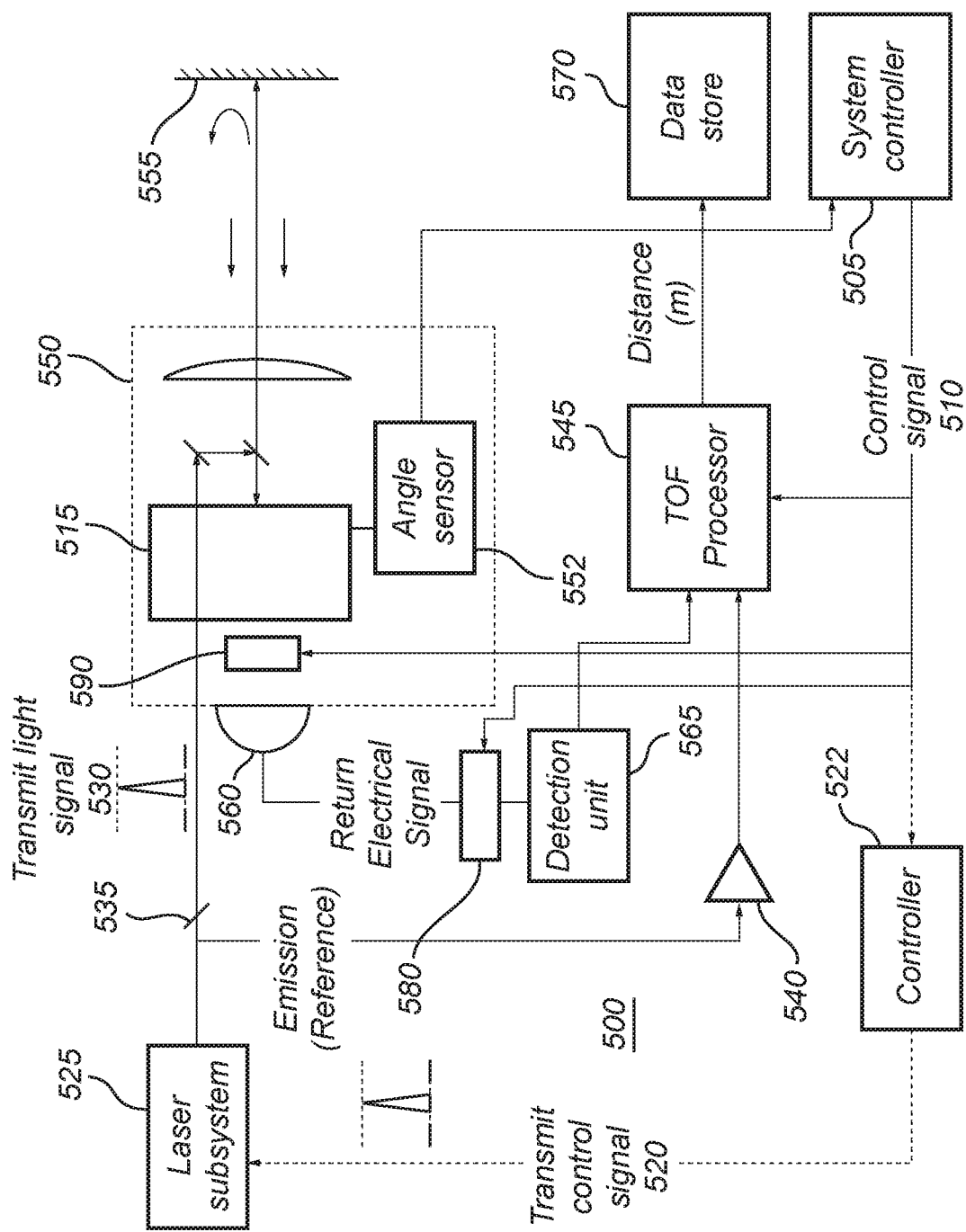

FIG. 5 schematically illustrates a distance measurement system 500 in which embodiments of the invention can be implemented. A system controller 505 may communicate via control signals 510 with a transmit-signal controller 522 to coordinate system operation. System controller 505 issues a control signal 510 to transmit-signal controller 522 to start a measurement. Transmit-signal controller 522 issues a transmit-pulse control signal 520 to a laser subsystem 525. Laser subsystem 525 responds by emitting a transmit light signal 530. Transmit light signal 530 can be a single pulse, as illustrated, or a set of pulses or other signed pattern.

Transmit light signal 530 passes through a splitter 535. A portion of the energy from transmit light signal 530 passes to a detector element 540 to provide an emission time reference to time-of-flight (TOF) processor 545 for the transmit light signal 530. A portion of the energy from transmit light signal 530 passes through an optical subsystem 550 including a deflection module 515 and is directed with a certain deflection angle at a target 555 external to the system 500. The return light signal from target 555 passes through the optical subsystem 550 and the deflection module 515 to an opto-electrical converter 560. Opto-electrical converter 560 provides a return electrical signal to a detection unit 565. Detection unit 565 determines a receive time from the return electrical signal.

TOF processor 545 determines a corresponding time of flight for laser pulse 530 and converts the resulting time-of-flight value to a corresponding measurement distance that is, for example, stored in a data store 565. The time-of-flight processor 545 may be a separate processor, or may be a process running in a computer which also runs the process of system controller 505 and/or pulse controller 522 and/or other processes. Functionality is described here with reference to particular elements of FIG. 5 for convenience of illustration, but can be combined in one or more elements or assigned to other elements as may be convenient.

Transmitter 525 is optionally a free-running laser system that emits transmit light signals without a transmit command. Control signal 510, transmit controller 522 and transmit control signal 520 are shown in dashed lines to indicate that these are not required if transmitter 525 is free-running.

The measurement system 500 may further include a sensor for detecting a rotation angle or a displacement of a deflection element of the deflection module 515. The deflection module 515 may be equivalent to the deflection module 315 or 415 described with reference to FIGS. 3 and 4.

According to some embodiments, the distance measurement system or apparatus 500 may be equipped with one or more attenuators 580, 590 (as will be also further described with reference to FIGS. 18-21 according to various possible configurations) which is configured to apply an attenuation to at least one of the return light signal and the return electrical signal. For a certain deflection angle, the attenuation varies (or the attenuation level of the attenuator is regulated), as time passes, after emission of the transmit light signal, according to a time-dependent attenuation function such as will be described with reference to e.g. FIG. 8B.

The attenuators 580, 590 may be equivalent to the attenuators 480, 490 described with reference to FIG. 4 and may communicate with the other units of the measurement system in a similar manner.

FIG. 6 shows at 600 a timing diagram of a distance measurement in accordance with some embodiments. Time t1 is the emission time of a transmit light signal 605 such as a light pulse for a measurement. Time t2 is the receive time of the corresponding return light signal 610 (i.e. the returning light pulse or reflected light pulse representative of the reflection of the transmitted light pulse at the target). The distance measurement is derived from the time difference $\delta t = t2 - t1$. Time t3 is the emission time of a transmit light signal 615 of a following measurement. The time difference t3-t1 is the transmit light signal repetition interval.

Although the example of FIG. 6 shows the times t1 and t2 and t3 at the peaks of respective return light pulses, the receive time of return light can be determined in other ways, such as a threshold of a leading edge or a computed center of gravity of a pulse or set of pulses or other characteristic of the return light signal.

With reference to FIGS. 7A-C and 8A-C, an example of a time-dependent attenuation function to be applied to an attenuator for deflection angle will be described.

FIG. 7A schematically illustrates at 700 the return light signal from a target 705 at distance A from the optical subsystem 710. A large part of the transmit light signal that is reflected from the target at distance A is collected by the optical subsystem 710, but only a small part of that light reaches the detector 715.

Figure 7B:
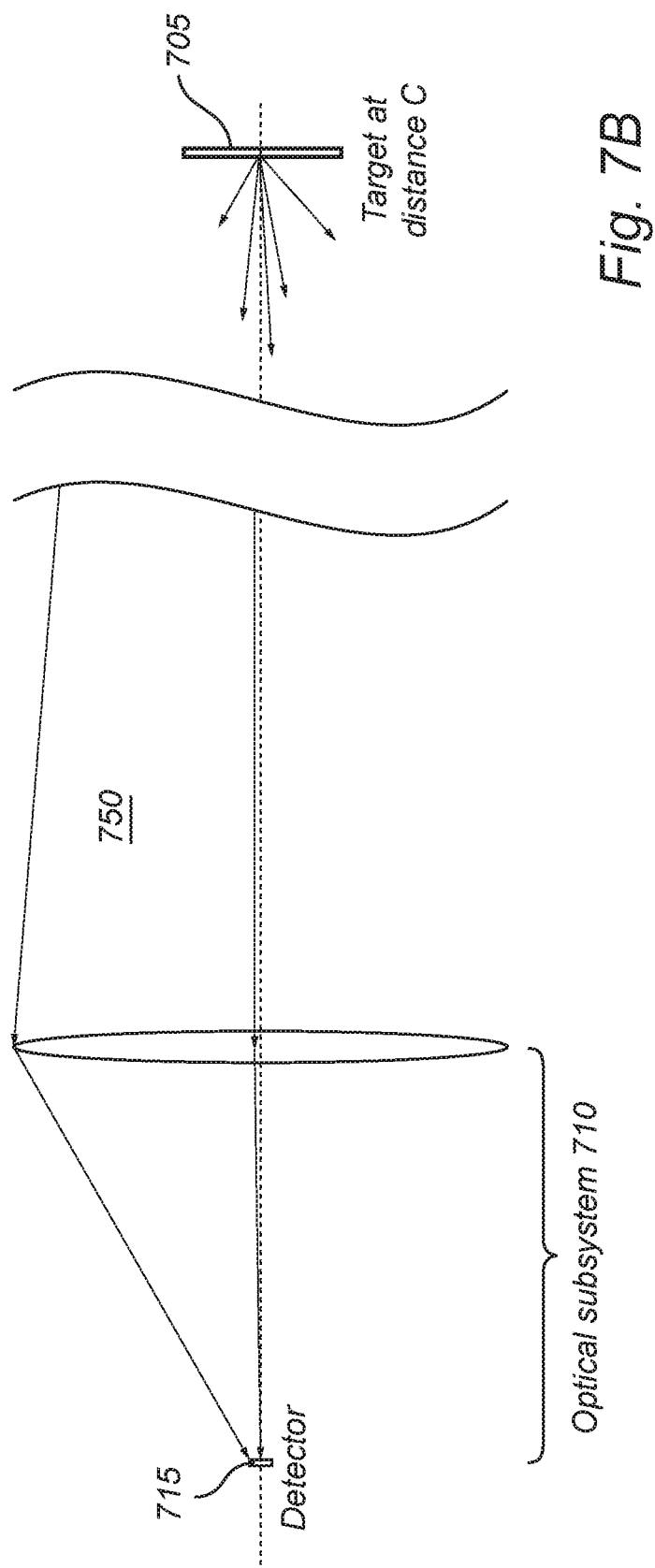

FIG. 7B schematically illustrates at 750 the return light signal from a target 705 at distance C from the optical subsystem 710. A small part of the transmit light signal that is reflected from the target at distance C is collected by the optical subsystem 710, but a large part of that light reaches the detector 715.

Figure 7C:
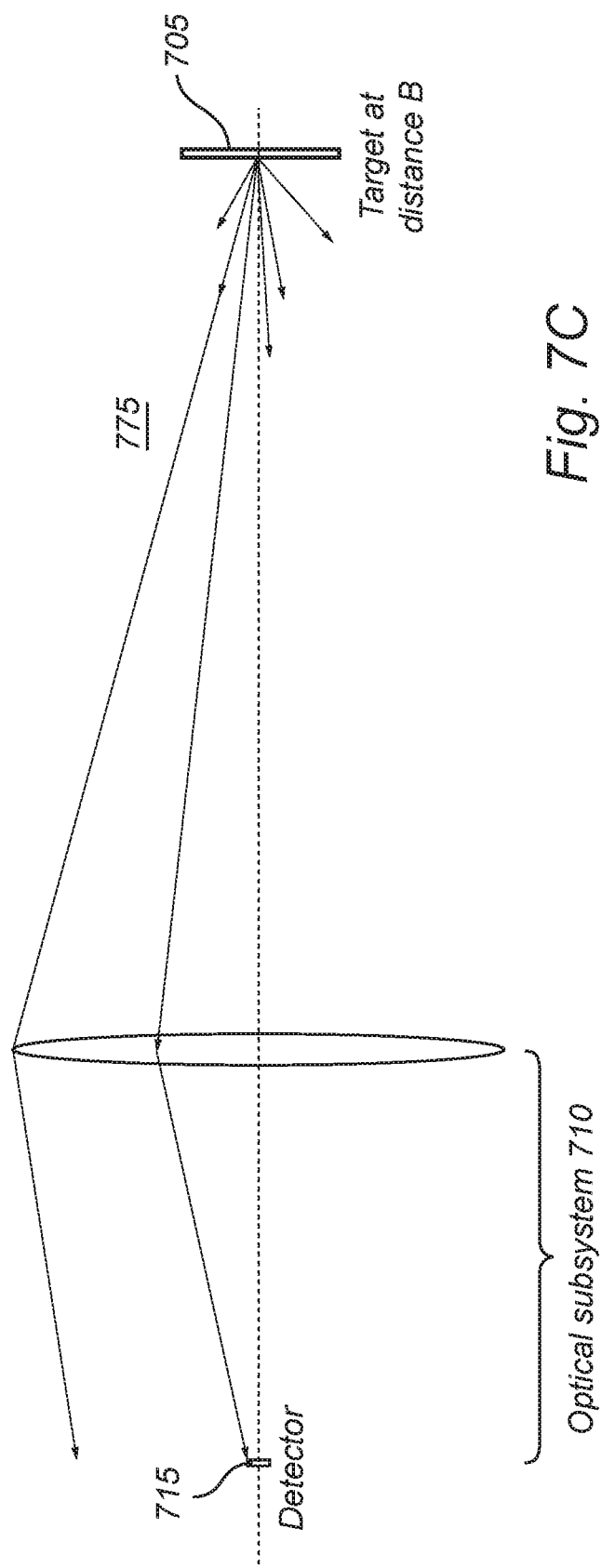

FIG. 7C schematically illustrates at 775 the return light signal from a target 705 at distance B from the optical subsystem 710. Distance B is greater than distance A and less than distance C. The amount of the transmit light signal that is reflected from the target at distance B and reaches detector 715 is at a maximum with the target at distance B.

It will be appreciated that although the deflection module is not shown in FIGS. 7A-C in the optical subsystem 710, the principle is the same except that the deflection module would introduce a deflection to the light beams.

Figure 8A:
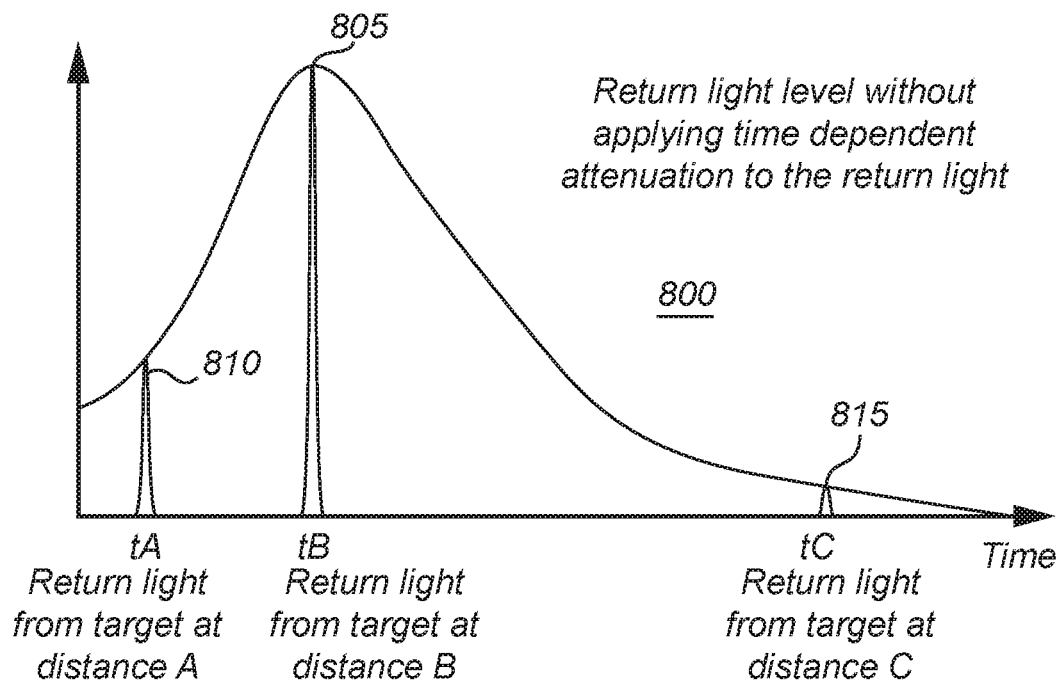
FIG. 8A shows an example of the level of return light from a target as a function of time.

FIG. 8A shows at 800 an example of the level of return light from a target, without applying time-dependent attenuation to the return light signal or the return electrical signal, as a function of time following emission of transmit light. The level 805 of return light from a target at distance B is at a maximum, corresponding to the arrangement of FIG. 7C. The level 810 of return light from a target at distance A is less than that from a target at distance B, corresponding to the arrangement of FIG. 7A. The level 815 of return light from a target at distance C is also less than that from a target at distance B, corresponding to the arrangement of FIG. 7B.

Figure 8B:
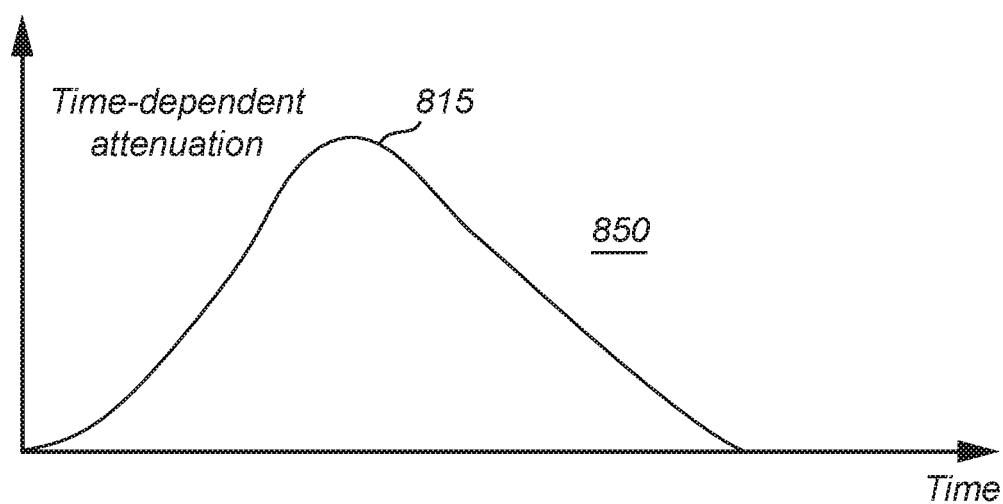
FIG. 8B shows a time-dependent attenuation function as a function of time in accordance with some embodiments.

FIG. 8B shows at 850 a desired time-dependent attenuation function 815 as a function of time following emission of transmit light. Applying such time-dependent attenuation can substantially reduce dynamic range of the return light and/or the electrical signal resulting from detection of the return light.

FIG. 8B shows an example of an attenuation function wherein the attenuation increases as a function of time from the emission time of the transmit light signal (or from any time event related to the emission time of the transmit light signal) up to the critical time. After the critical time, the attenuation decreases as a function of time.

The critical time is dependent on at least geometrical parameters of the optical subsystem of the receiving system. Referring again to FIG. 7C, the critical time corresponds to a light travel distance (B) for which a maximum amount of light is obtained at the detector 715 of the optical subsystem, i.e. the distance for which the amount of the transmit light signal that is reflected from the target and reaches the detector 715 is maximum.

As schematically illustrated in FIGS. 5 and 7A-7C, an optical element such as a lens may be arranged at the first aperture to direct the return light signal reaching the optical subsystem 550, 710 at the detector 560, 715.

It will be appreciated that although the deflection module is not shown in FIGS. 7A-C in the optical subsystem 710, the principle is the same except that the deflection module would introduce a deflection to the light beams.

Figure 8C:
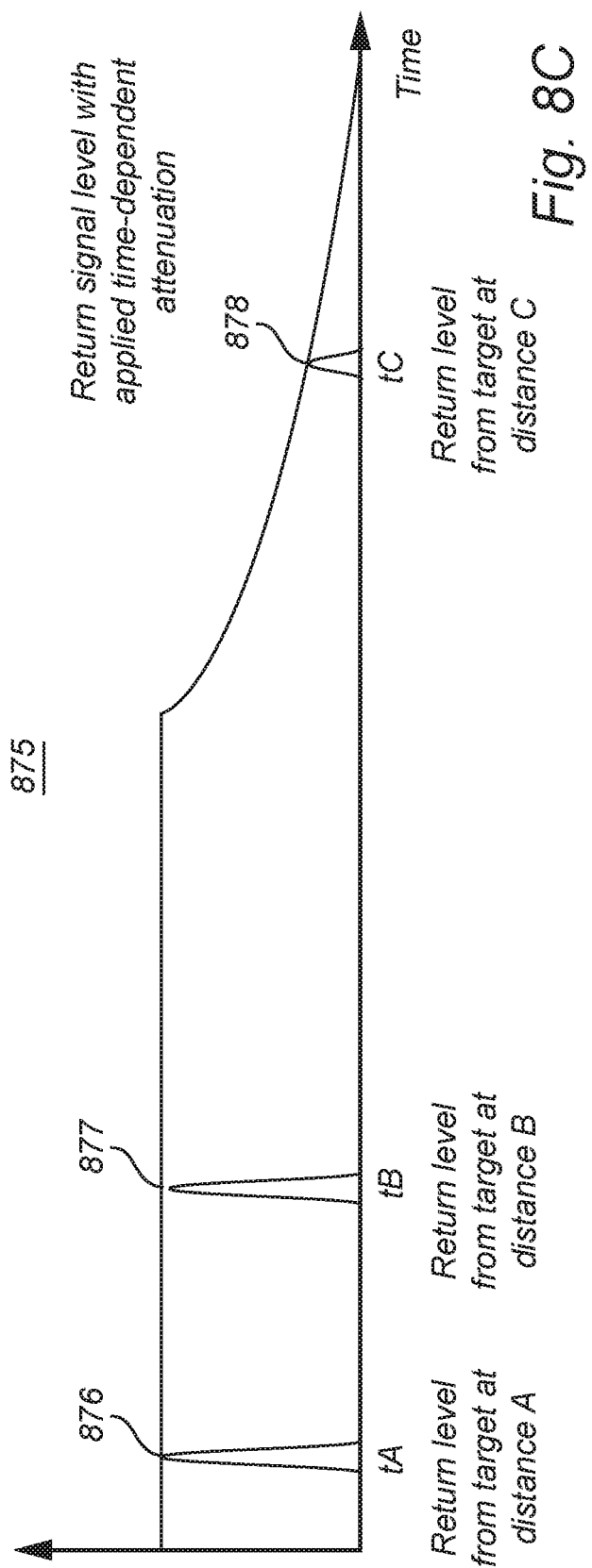
FIG. 8C shows an example of the return signal level with applied time-dependent attenuation as a function of time.

FIG. 8C shows at 875 an example of the return signal level with applied time-dependent attenuation 815 as a function of time following emission of transmit light for a particular deflection angle. The attenuation is applied to the return light and/or to the electrical signal resulting from detection of the return light, as explained with reference to the examples below. The return signal level 876 from a target at distance B is substantially the same as the return signal level 877 from a target at distance A. The return signal level 878 from a target at distance C is unaffected because the attenuation is minimal at the time corresponding to distance C.

Although a specific time-dependent attenuation function has been described with reference to FIGS. 7A-C and 8A-C, it will be appreciated that any time-dependent attenuation function may be used. The present embodiments may be applied even for time-dependent attenuation function deviating from the function shown in FIG. 8B. It may for example be envisaged to select the appropriate time-dependent attenuation function among a number of functions being inversely proportional to the square of the pulse travel time.

Figure 9:
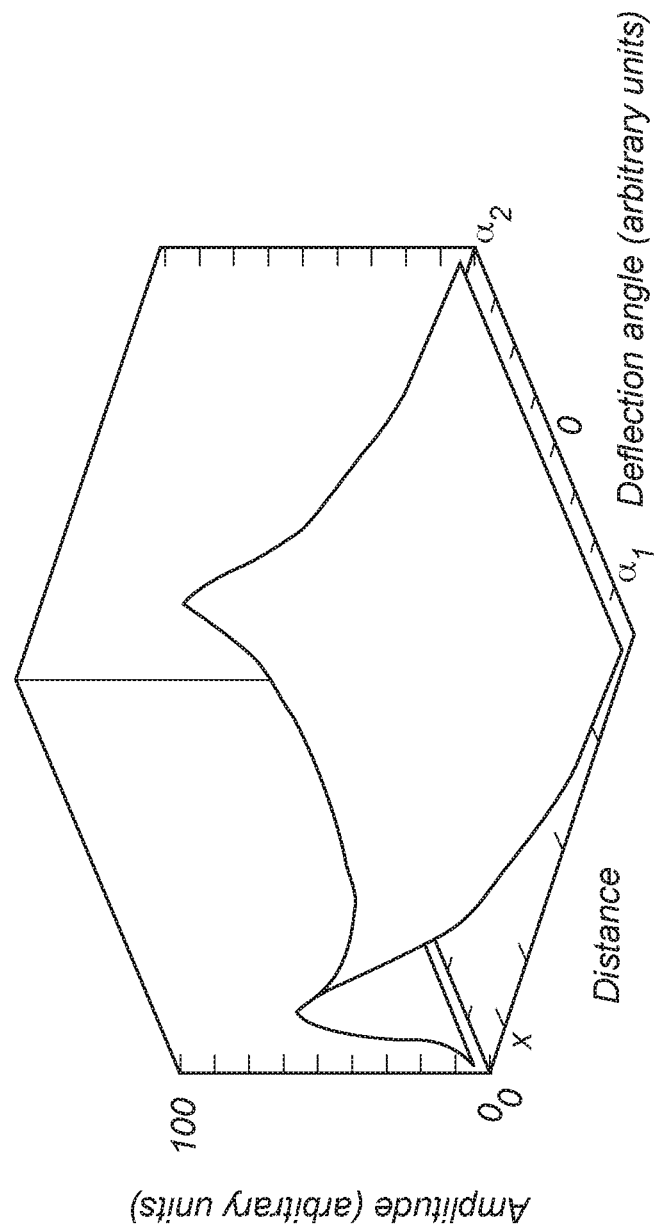
FIG. 9 shows the level of return light from a target as a function of distance (or time) and as a function of deflection angle in accordance with some embodiments.

FIG. 9 shows a graph illustrating the dependence of the amplitude of a return electric signal as a function of the distance (or time) and as a function of the deflection angle at which at least one of the transmit path and the receive path is transmitted. As can be seen, the amplitude or power level of the return electric signal depends on the deflection angle, in particular in the near-field, i.e. for a region of about 0 to x meters in the present example. Accordingly, an attenuation function used for compensating the dependence of the power level as a function of time (or distance) at a particular deflection angle, for example at a deviation angle $\alpha_2$ in the example shown in FIG. 9, may not be appropriate for compensation at another deflection angle such as for example 0 degree or at the deflection angle $\alpha_1$. Thus, the measurement instrument may be configured to select a specific time-dependent attenuation function for a certain deflection angle.

It will be appreciated that the function of determining (or selecting) the time-dependent attenuation function to be applied to an optical attenuator or an electric attenuator may be located at any entities in the measurement instrument. By way of example, the measurement instrument may include a processor, such as the processor 470 shown in the instrument 400 described with reference to FIG. 4, for selecting the appropriate time-dependent attenuation function depending on the deflection angle. However, a separate controller or a system controller such as the controller 505 of the instrument 500 described with reference to FIG. 5 may be configured to select the time-dependent attenuation function. As another example, the attenuator itself may be configured to make such a selection. The entity configured to select the time-dependent attenuation function may be configured to receive information relative to the deflection angle such as the deflection angle itself, or a rotation angle or a position of a deflection element with which the transmit path and/or the receive path is deflected. This entity may then be in communication with the attenuator(s) to apply the selected time-dependent attenuation function.

With reference to FIGS. 10-17, a number of deflection elements and configurations of deflection elements to be used as e.g. a deflection element in the deflection modules 415, 515 of the instruments 400, 500 shown in FIGS. 4 and 5, respectively, will be described in the following.

FIG. 10 illustrates at 1000 a first embodiment of a deflection element which may be used as the deflection element denoted 340 in the subsystem 300 or the instruments 400, 500 described with reference to FIGS. 3, 4 and 5, respectively. The deflection element may be a prism 1005 which rotates as shown by arrow 1010 about a rotation axis 1015. A beam 1020 traverses the prism 1005 and exits as beam 1025. The prism 1005 is shown as having eight faces distributed about the rotation axis 1015. In some embodiments, the prism 1005 may have six to ten faces distributed about the rotation axis 1015.

The prism 1005 may be operative to displace the transmit path and/or the receive path as it rotates. FIG. 11A-FIG. 11E illustrate the deflection of a beam path with rotation of the prism 1005.

Figure 11A:
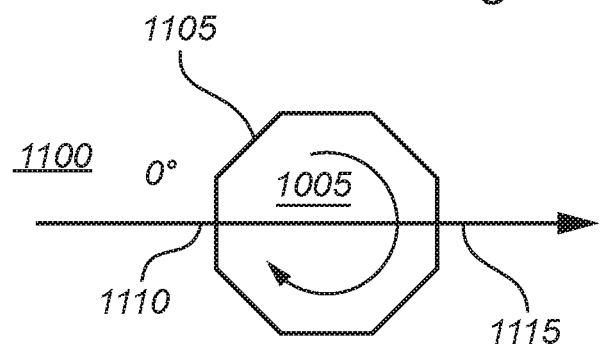

FIG. 11A at 1100 shows the prism 1005 at a zero-degree rotation angle as indicated at 1105. An entry beam path 1110 and an exit beam path 1115 are aligned.

Figure 11B:
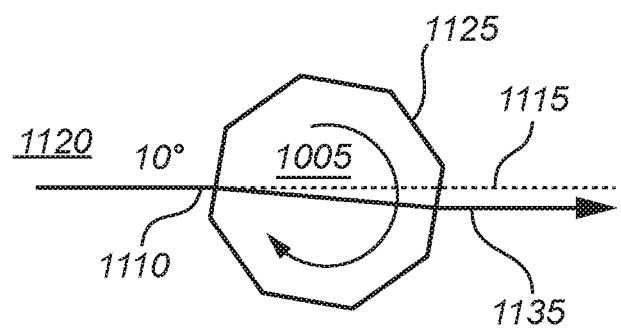

FIG. 11B at 1120 shows the prism 1005 at a ten-degree rotation angle in the clockwise direction relative to FIG. 11A as indicated at 1115. The exit beam path 1135 is displaced downwardly relative to the entry beam path 1110 and is parallel to the extension of the entry beam path 1110. Reference number 1115 shows the extension of the incoming beam 1110 in the prism 1005. Although not necessary, it will be appreciated that in some embodiments the nominal optical path of the outgoing beam, as denoted by 1115, i.e. the beam path in a configuration with a zero-degree rotation angle as in FIG. 11A, may be aligned with the normal optical axis of the subsystem in which the deflection element 1005 is arranged.

Figure 11C:
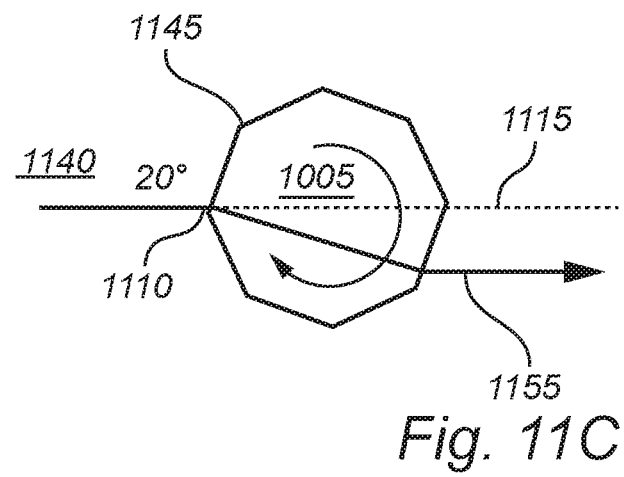

FIG. 11C at 1140 shows the prism 1005 at a twenty-degree rotation angle in the clockwise direction relative to FIG. 11A as indicated at 1145. The exit beam path 1155 is displaced still further downward relative to the entry beam path 1110 than in FIG. 11B and is parallel to the extension 1115 of the entry beam path 1110.

Figure 11D:
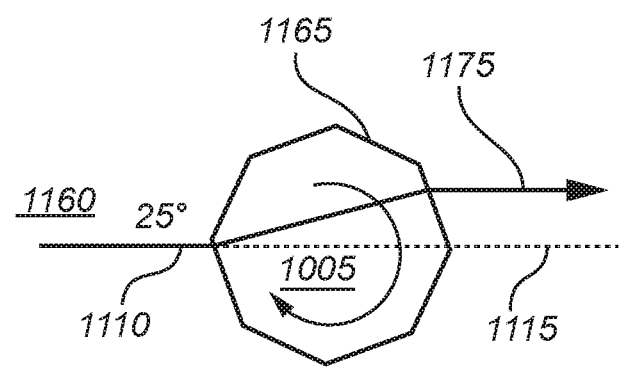

FIG. 11D shows at 1160 the prism 1005 at a twenty-five-degree rotation angle in the clockwise direction relative to FIG. 11A as indicated at 1165. The exit beam path 1175 is displaced upward relative to the entry beam path 1110 and is parallel to the (extension 1115 of the) entry beam path 1110.

Figure 11E:
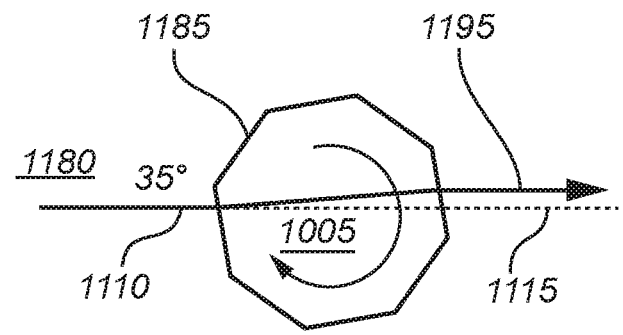

FIG. 11E shows at 1180 the prism 1005 at a thirty-five-degree rotation angle in the clockwise direction relative to FIG. 11A as indicated at 1185. The exit beam path 1195 is displaced somewhat less upward relative to the entry beam path 1110, than in FIG. 11D and is parallel to the entry beam path 1110.

The series of images in FIG. 11A-FIG. 11E show that the beam path is displaced in one direction as the prism 1005 is rotated and jumps back momentarily when the entering beam switches from one facet to the next. This has the advantage of converting a continuous rotation into a repetitive and linear displacement of the beam. Continuous rotation requires very little energy to sustain and causes very little vibration, as compared for example with an oscillating movement of a mechanical element. As already described with reference to FIG. 5 for instance, information relative to the rotation angle, as e.g. provided by an angle sensor or a controller controlling the prism 1000, may be sent to an attenuator or another entity controlling the attenuator such that a time-dependent attenuation function adapted for the particular rotation angle (and consequently for the currently travelling light pulse) is selected to attenuate the return light signal and/or the return electrical signal corresponding to the transmit light pulse at this rotation angle.

In some embodiments, the deflection element may further include a deflection lens assembly in the transmit path and/or receive path, such that displacement of the transmit path and/or receive path is converted to an angular deflection across the optical axis of the instrument. FIG. 12A-FIG. 12C illustrate the deflection of a beam path with rotation of the prism 1005 and the effect of introducing a deflection lens assembly 1202.

FIG. 12A at 1200 shows the prism 1005 at a zero-degree rotation angle as in FIG. 11A, as indicated at 1205. The entry beam path 1110 and the exit beam path 1115 are aligned. The deflection lens assembly 1202 has a focal distance f shown at 1215. The exit beam path passes through the deflection lens assembly 1202 to a focal point 1210 without deflection.

FIG. 12B at 1220 shows the prism 1005 at a ten-degree rotation angle as compared to the configuration shown in FIG. 12A (i.e. as in FIG. 11B) as indicated at 1225. The exit beam path 1135 is displaced relative to the entry beam path 1110. The exit beam path 1135 then passes through the deflection lens assembly 1202 and is deflected toward the focal point 1210 at a deflection angle 1230.

FIG. 12C at 1240 shows the prism 1005 at a twenty-degree rotation angle as in FIG. 11C as indicated at 1245. The exit beam path 1155 is displaced still further relative to the entry beam path 1110. The exit beam path 1155 then passes through the deflection lens assembly 1202 and is deflected toward the focal point 1210 at a deflection angle 1250.

The series of images in FIG. 12A-FIG. 12C show that the exit beam path is directed toward the focal point 1210 at each deflection increment as the prism 1005 is rotated. The focal point 1210 is the rotation point of the deflected beam.

In some embodiments, the prism 1005 may be operative to displace the receive path as it rotates, such as by having the receive path spaced apart from the transmit path along the rotation axis 1015 of the prism 1005 and parallel to the transmit path. In some embodiments, the deflection lens assembly may also lie in the receive path, such that displacement of the receive path with rotation of the prism 1005 is converted to an angular deflection across the optical axis of the instrument. In some other embodiments, two completely separate deflection elements may be used for the transmit path and the receive path.

FIG. 13 at 1300 shows a further example of a deflection element which may be used as the deflection element of the deflection modules 415, 515 in the instruments 400, 500 described with reference to FIGS. 4 and 5, respectively. In this example, the deflection element may be a multi-faceted mirror 1305 rotating as indicated at 1310 about a rotation axis 1315. The multi-faceted mirror 1305 is shown as having six facets distributed about the rotation axis 1315. In some embodiments, the multi-faceted mirror 1305 may have twenty to forty such facets. A beam arriving along a path 1320 may be reflected from a facet of the mirror 1305 to depart along another path 1325. This other path 1325 may be deflected with rotation of the mirror 1305 so that the departing beam path (i.e. a pointing direction of the departing beam) may be swept around the rotation axis 1315. In other words, the departing beam path 1325 rotates around the rotation axis, as indicated at 1330, while it remains orthogonal to the rotation axis 1315.

FIG. 14 at 1400 shows a further example of a deflection element which may be used as the deflection element of the deflection modules 415, 515 in the instruments 400, 500 described with reference to FIGS. 4 and 5, respectively. In this example, the deflection element may be a mirror disk 1405 with a scalloped, curving mirrored surface 1410. The mirror disk 1405 may rotate as indicated by arrow 1415 about a rotation axis 1420. A beam entering along a entry beam path 1425 may be deflected along an exit beam path 1430. The exit beam path 1430 may be deflected back and forth with rotation of the mirror disk 1405 about the rotation axis 1420.

In some embodiments, the scalloped, curving mirrored surface 1410 may be shaped to provide linear deflection of at least one of the transmit path and the receive path when rotated about the rotation axis 1420 at a constant rotational velocity. In some other embodiments, the scalloped, curving mirrored surface 1410 may be shaped to provide non-linear deflection of at least one of the transmit path and the receive path when rotated about the rotation axis 1420 at a constant rotational velocity.

The examples of FIG. 11A-FIG. 11E, FIG. 12A-12C, FIG. 13 and FIG. 14 show the deflection element rotating in the clockwise direction. In some embodiments the deflection element may rotate in the opposite (counter-clockwise) direction. In some embodiments, the deflection element may rotate alternately in the clockwise and counter-clockwise directions (i.e., oscillates).

It will be appreciated that in the examples shown in FIGS. 11-14, in case the deflection element, such as a prism, a multi-faceted mirror or a disk having a scalloped curving mirrored surface, is rotated such that the incoming beam hits the deflection element at an edge between two facets, the beam may be split in two and the deflection may then become ambiguous. For this purpose, the rotation of the deflection element may be adjusted to avoid that the beam hits an edge between two facets. Alternatively, the instrument may be configured such that no measurement is captured (by controlling the operation of the distance measurement module for instance) while an edge is located in the optical path of the beam or such that any measurement captured under such conditions is not recorded or taken into account. While a larger number of facets would require a lower rotation speed to achieve a certain number of deflection sweeps, this would on the other hand result in more edges obstructing the measurements, which would then have to be disregarded because of ambiguity.

FIG. 15A at 1500 shows an example of a deflection element, shown generically at 1510, which may be used as the deflection element of the deflection modules 415, 515 in the instruments 400, 500 described with reference to FIGS. 4 and 5, respectively. The deflection element 1510 may rotate about an optical axis 1520 in one direction (e.g., counter-clockwise) as indicated by arrow 1530.

FIG. 15B at 1550 shows an example of a deflection element, shown generically at 1560, which may be used as the deflection element of the deflection modules 415, 515 in the instruments 400, 500 described with reference to FIGS. 4 and 5, respectively. The deflection element 1560 may rotate about an optical axis 1520 alternately in the clockwise direction and in the counter-clockwise direction (i.e., oscillating) as indicated by arrow 1570.

FIG. 16A, FIG. 16B and FIG. 16C show deflection of a beam path with linear motion of a deflection element in accordance with some embodiments.

FIG. 16A at 1600 shows an entry beam path 1610 along the optical axis 1605 of the deflection element 1625, which in the present example is a lens (or lens assembly). The lens is mounted for linear motion across the optical axis 1605. In the specific examples shown in FIGS. 16A-16C, the lens 1625 moves orthogonally to the optical axis 1605. In FIG. 16A, a an exit beam path 1615 also lies on the optical axis 1605 of the lens 1625 and is aligned with the entry beam path 1610.

FIG. 16B at 1620 shows the lens 1625 displaced downwardly relative to the entry beam path 1630. As a result, the exit beam path 1635 is deflected downwardly at an angle relative to the extension of the entry beam path 1630.

FIG. 16C at 1640 shows the lens 1625 displaced upwardly relative to the entry beam path 1650. The exit beam path 1655 is deflected upwardly at an angle relative to the extension of the entry beam path 1650.

In some embodiments, the beam may be deflected by linear displacement of a deflection element.

FIG. 17A-FIG. 17C show an example in which the deflection element is an optical wedge 1705 displaced by a linear drive element generally transversely to an optical axis 1710 of a deflection lens assembly 1712.

In FIG. 17A at 1700, the entry beam path 1715 is deflected by a wedge 1705 toward the optical axis 1710. The exit beam path 1720 passes along the optical axis 1710.

In FIG. 17B at 1730, the wedge 1705 is moved upward as indicated by arrow 1735. The entry beam path 1715 is deflected (or displaced) below the optical axis 1710. The exit beam path 1740 may be deflected upwardly through the optical axis 1715 by the deflection lens assembly 1712.

In FIG. 17C at 1760, the wedge 1705 is moved downward as indicated by arrow 1765. The entry beam path 1715 is deflected above the optical axis 1710. The exit beam path 1770 may be deflected downwardly through the optical axis 1715 by the deflection lens assembly 1712.

FIG. 18 shows a schematic diagram of an apparatus 1800 for measuring distance in accordance with some embodiments. The apparatus 1800 includes a transmitter operative to emit a transmit light signal toward a target 1890 at an emission time. Target 1890 does not form a part of the apparatus 1800.

The apparatus 1800 may include a controller 1805 and an attenuation control signal generator 1820 responsive to the controller 1805 to produce at least one time-dependent attenuation control signal related in time to the emission time.

The controller 1805 is configured to receive information associated with the deflection angle provided by the deflection module 1815 of the instrument, such as a rotation angle or displacement of the deflection element of such deflection module, in order to select the corresponding time-dependent attenuation function. As another example, the controller 1805 may receive or obtain information relating to the control of the deflection element, such as its rotation speed or displacement profile, from which a position and/or orientation of the deflection element and thereby the deflection angle may be derived. Either the information associated with the deflection angle or the selected time-dependent attenuation function may be communicated to the attenuation control signal generator 1820 for generating the time-dependent attenuation control signals.

A receiving system 1825 of apparatus 1800 includes an optical subsystem 1830 having a first aperture 1835 and a detection aperture 1840.

The amount of light reaching the first aperture 1835 from the target may be described by a first function dependent on distance D between the first aperture and the target. The first function is, for example, as shown in FIG. 19A.

FIG. 19A shows an example of a first function relating the amount of light reaching the first aperture 1835 to distance D between the first aperture 1835 and the target. The first function is, for example, a $1/d^2$ relationship.

The amount of light passing through the first aperture 1835 and reaching the detection aperture 1840 without applied attenuation may be described by a second function dependent on distance D between the first aperture 1835 and the target. The second function is, for example, as shown in FIG. 19B.

FIG. 19B shows an example of a second function relating the amount of light passing through the first aperture 1835 and reaching the detection aperture 1840, without applied attenuation, to distance D between the first aperture 1835 and the target. In some embodiments the second function may be determined by design parameters of the optical subsystem 1830, such as the sizes of the first aperture 1835 and the second aperture 1840 and the spacing between the first aperture 1835 and the second aperture 1840.

Receiving system 1825 further includes an opto-electrical converter 1845 to convert a return light signal to a return electrical signal.

The apparatus 1800 may include at least one attenuator, such as an optional optical attenuator 1850 and/or an optional electrical attenuator 1855. Each attenuator 1850, 1855 is configured to apply attenuation to at least one of the return light signal and the return electrical signal, respectively. The attenuation is regulated, as time passes, after emission of the transmit light signal (or light pulse). For a particular deflection angle (i.e. for a particular light pulse), the attenuation may vary according to a time-dependent attenuation function such that the attenuation is maximum at a critical time. However, other attenuation functions may be used.

For this purpose, each attenuator 1850, 1855 may be responsive to a control signal from the attenuation control signal generator 1820. Attenuation is applied to the return light signal by optical attenuator 1850 and/or to the return electrical signal by electrical attenuator 1855, to obtain an attenuated electrical signal that is compensated for a combination of at least the first function and the second function. The return light signal may be conveyed to opto-electrical converter 1840 by one or more suitable optical elements 1860, 1865, such as optical fibers.

FIG. 18 depicts several optional configurations of attenuators. A first configuration is to use an optical attenuator 1850 to compensate the return light signal before the return light signal reaches opto-electrical converter 1845. Opto-electrical converter 1845 then produces a return electrical signal that is compensated for in accordance with the selected time-dependent attenuation function.

A second configuration is to use an electrical attenuator 1855 to compensate the return electrical signal after the opto-electrical converter 1845 has converted the return light signal to a return electrical signal.

A third configuration is to use an optical attenuator 1850 to make a partial compensation on the return light signal before the return light signal reaches opto-electrical converter 1845, and make an additional compensation on the return electrical signal after the opto-electrical converter 1845 has converted the attenuated return light signal from optical attenuator 1850 to a partially-attenuated return electrical signal.

That is, compensation may be performed entirely by optical attenuator 1850, entirely by electrical attenuator 1855, or partially by optical attenuator 1850 and partially by electrical attenuator 1855.

A detection unit 1870 may determine a receive time from the return electrical signal (or the attenuated electrical signal) using a suitable technique, such as a threshold of a leading edge or a computed center of gravity of a pulse or set of pulses or other characteristic of the return light signal.

The determined receive time is supplied to a processor unit 1875. Processor unit 1875 also receives an emission time of the transmit light signal corresponding to the receive light signal. Processor 1875 is in some embodiments a time-of-flight processor such as TOF processor 545 of FIG. 5. The emission time is determined from an emission reference, or from a transmit command, as described with reference to FIG. 5, or by other suitable means.

Processor unit 1875 calculates a measured distance based on at least the emission time and the receive time. Other parameters are optionally included in the measured distance calculation, such as delay and/or distortion caused by conversion of the return light signal to a return electrical signal, by electrical attenuation, by electrical or electronic elements, and by environmental effects such as ambient temperature or ambient humidity.

The embodiment of FIG. 18 shows attenuation applied to the return light signal and/or to the return electrical signal. These and other configurations are illustrated in FIG. 20A, FIG. 20B, FIG. 20C and FIG. 20D.

FIG. 20A shows the first configuration described with reference to FIG. 18. Optional attenuator 1845 is responsive to an attenuation control signal from attenuation control signal generator 1815 to apply attenuation to the return light signal.

FIG. 20B shows the second configuration described with reference to FIG. 18. Optional attenuator 1855 is responsive to an attenuation control signal from attenuation control signal generator 1815 to apply attenuation to the return electrical signal.

FIG. 20C shows a further configuration. In this embodiment, optional optical attenuator 2055 is responsive to an attenuation control signal from attenuation control signal generator 1815 to apply attenuation to the return light between first aperture 1830 and detection aperture 1835.

FIG. 20D shows another configuration. In this embodiment, optional optical attenuator 2080 is responsive to an attenuation control signal from attenuation control signal generator 1815 to apply attenuation to the return light before the return light enters aperture 1830.

Some embodiments use a combination of any two or more of the configurations of FIG. 20A, FIG. 20B, FIG. 20C and FIG. 20D for attenuation of either one or both of the return light signal and the return electrical signal. Although not represented in FIGS. 20A-C, the deflection module of the instrument may be located between the first aperture 1830 and the detection aperture 1835, as illustrated in FIG. 18, for providing a deflection to the optical path.

FIG. 21 shows such a combination, with optional optical attenuators 1850, 2055, 2080 in an optical subsystem 2105, and with optional attenuator 1855 in an electrical subsystem 2110. One or more of attenuators 1850, 2055, 2080 and 1855 is used to attenuate either one or both of the return electrical signal and the return light signal.

Although in the above embodiments various configurations and arrangement of attenuators have been shown, it will be appreciated that the attenuation function may also be implemented at other places or units within the instrument. For example, the attenuation function may be implemented or integrated in the opto-electrical converter 1845 of the instrument shown in FIG. 21.

FIG. 22 illustrates distortion in the return electrical signal due to the applied attenuation. In this example, a pulse 2205 in an ideal system is shown as a function of time, with no attenuation applied. The resulting pulse 2210 when attenuation is applied is distorted (e.g., pulse shape has changed) and/or delayed as indicated by arrow 2215.

FIG. 23 is a schematic diagram 2300 of the electronics portion of a receiving system 1825. Receiving system 1825 is controlled by a processor 2305. In some embodiments, processor 2305 also serves as a system controller unit 505 and/or as processor unit 1875 to calculate measured distances.

Processor 2305 loads a stored table 2310 having an attenuation value for each of a sequence of time increments, representing the desired time-dependent attenuation functions. The attenuation function can be changed from one measurement to the next with such an arrangement to accommodate to the deflection angle used for each of the measurements.

A field-programmable gate array (FPGA) 2315 retrieves each attenuation value from the table 2310 in sequence. Each attenuation value is converted by digital-to-analog converter (DAC) 2320 to one or more attenuation control signals $U1(t)$, $U2(t)$, $U3(t)$, $U4(t)$, each of which is used to set the attenuation level of a respective variable attenuator 1855, 1845, 2055, 2080.

Opto-electrical converter 1845 converts the return light signal to a return electrical signal. Variable electrical attenuator 1855 attenuates the return electrical signal and/or the return light signal is attenuated by one or more of optical attenuators 1850, 2055, 2080.

The resulting attenuated electrical signal is converted by analog-to-digital converter (ADC) 2325 to a time series of digital values. FPGA 2330 determines the receive time of the return light signal.

FPGA 2315 and FPGA 2330 are shown as separate items in FIG. 23, but their functionality can be performed in a single device or distributed over multiple devices if desired.

In some embodiments, the values of table 2310 account for ambient temperature and/or ambient moisture. In some embodiments, a table is provided for each of a plurality of ranges of ambient temperature and/or ambient moisture, e.g., by calibration of the apparatus prior to making a distance measurement in the field. Ambient temperature and/or ambient moisture is determined in the field from user input or local sensor data and/or weather information retrieved from a remote source.

In some embodiments the values of table 2310 are determined by calibration prior to making measurements in the field. For this purpose, the distance measurement system may be equipped with a calibration unit or function for calibration of the optical subsystem. The calibration may be performed in factory or in the field.

FIG. 24A shows at 2400 a first example of a detection unit 1870 for determining a receive time from the (attenuated) return electrical signal. An ADC 2405 digitizes the return electrical signal and passes the resulting data to a processor 2410 such as a central processing unit (CPU), a digital signal processor (DSP) or a field programmable gate array (FPGA). Processor 2410 determines the receive time from the data.

FIG. 24B shows at 2430 a second example of a detection unit 1870 for determining a receive time from the return electrical signal. A level threshold comparator 2435 compares the return electrical signal with a threshold to indicate when the return electrical signal exceeds a predetermined threshold, and passes the result to a processor 2440 such as a CPU, DSP or FPGA. Processor 2440 determines the receive time from the threshold indication.

FIG. 24C shows at 2460 a third example of a detection unit 1870 for determining a receive time from the return electrical signal. A constant-fraction discriminator 2465 determines a maximum level of the return electrical signal by finding the time when its slope is at zero. Processor 2470 determines the receive time from the time when the slope is at zero.

FIG. 25 shows at 2500 a flow chart of a method of operating a distance measuring system in accordance with some embodiments of the invention.

At step 2505 a transmit light signal is transmitted along a transmit path at an emission time. At step 2510 a return light signal (which corresponds to the reflection of the light transmit signal at the target) is received at a receive time along a receive path. At step 2520 at least one of the transmit path and the receive path is deflected at a deflection angle relative to an optical axis of the instrument. At step 2525 the return light signal is converted to a return electrical signal. At step 2530 a time-dependent attenuation function is selected based on information relative to the deflection angle. At step 2535 an attenuation is applied to at least one of the return light signal and the return electrical signal according to the selected time-dependent function and at step 2540 a measured distance is determined based on at least the emission time and the receive time. The process optionally returns at step 2540 to repeat steps 2505-2535 for a subsequent measurement.

The method described with reference to FIG. 25 may be combined with any feature or embodiment of the apparatus or distance measurement system described with reference to FIGS. 1-24.

Although the present invention has been described with reference to detailed examples, the detailed examples only serve to provide the skilled person with a better understanding, and are not intended to limit the scope of the invention. The scope of the invention is much rather defined by the appended claims.

For example, although it has been shown in the above embodiments that a deflection of the measurement path across the instrument optical axis may be achieved by a mechanical displacement or rotation of a deflection element, a deflection of the measurement path may be obtained without any mechanical motion, and in particular without rotating or moving any part(s) of the instrument or any deflection element. The deflection of the measurement path may be achieved using a deflection element based on electro-optical effect wherein an optical property (or characteristic) of a deflection element, such as its refractive index, or even its shape, may be altered by appliance of an electrical bias (voltage) upon the deflection element.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

In accordance with embodiments of the present invention, the components, process steps and/or data structures may be implemented using various types of operating systems (OS), computer platforms, firmware, computer programs, computer languages and/or general-purpose machines. Portions of the methods can be run as a programmed process running on processing circuitry. The processing circuitry can take the form of numerous combinations of processors and operating systems, or a stand-alone device. The processes can be implemented as instructions executed by such hardware, by hardware alone, or by any combination thereof. The software may be stored on a program storage device readable by a machine. Computational elements can be readily implemented using an object-oriented programming language such that each required element is instantiated as needed.

Those of skill in the art will recognize that devices of a less general-purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with an embodiment of the present invention, the methods may be implemented in part on a data processing computer such as a portable computing device, personal computer, workstation computer, mainframe computer, or high-performance server running an operating system. The methods may also be implemented on a multiple-processor system, or in a computing environment including various peripherals such as input devices, output devices, displays, pointing devices, memories, storage devices, media interfaces for transferring data to and from the processor(s), and the like. Such a computer system or computing environment may be networked locally, or over the Internet.

Any of the above-described methods and their embodiments may be implemented in part by means of a computer program. The computer program may be loaded on an apparatus as described above. Therefore, the invention also relates to a computer program, which, when carried out on an apparatus performs portions of any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a DVD, a CD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update that can be installed on apparatus already in the field, i.e. a computer program delivered to the field as a computer program product. This applies to each of the above-described methods and apparatuses.

The invention claimed is:

1. A distance measurement instrument, comprising:
 a transmitter unit configured to emit a transmit light signal toward a target along a transmit path at an emission time;
 a receiver unit configured to receive at a receive time a return light signal along a receive path and to convert the return light signal to a return electrical signal;
 at least one deflection module configured to deflect at least one of the transmit path and the receive path with a deflection angle relative to an optical axis of the instrument;
 at least one attenuator configured to apply an attenuation to at least one of the return light signal and the return electrical signal according to a time-dependent function selected based on information relative to the deflection angle; and
 a processor unit configured to determine a measured distance to the target based on at least the emission time and the receive time;
 wherein a set of time-dependent attenuation functions are based on an optical arrangement and type of said at least one deflection module, and wherein for a certain orientation or displacement of said at least one deflection module, the at least one attenuator is configured to apply the attenuation according to the time-dependent function out of the set of time-dependent attenuation functions.

2. The instrument according to claim 1, wherein the deflection module comprises at least one deflection element mounted for rotational motion and/or translational displacement such that at least one of the transmit path and the receive path is deflected with rotation and/or translational displacement of the deflection element.

3. The instrument according to claim 2, further comprising a sensor operative to detect an angle of rotation of the deflection element and/or a displacement sensor operative to detect a translational displacement of the deflection element, wherein the information relative to the deflection angle is the detected angle of rotation and/or the detected translational displacement.

4. The instrument according to claim 2, wherein the information relative to the deflection angle includes a starting position of the deflection element relative to the instrument optical axis and at least one of a rotation speed, a translation speed, and a displacement profile of the deflection element.

5. The instrument according to claim 2, further comprising a deflection lens, wherein optical displacement due to the deflection element is converted to optical deflection, to produce angular deflection of the transmit path and/or the receive path across the instrument optical axis.

6. The instrument according to claim 2, wherein the deflection element comprises at least one of a prism, a multi-faceted mirror, and a disk having a scalloped curving mirrored surface.

7. The instrument according to claim 1, wherein the time-dependent attenuation function includes a maximum of attenuation at a critical time elapsed since the emission time of said transmit light signal.

8. The instrument according to claim 7, wherein the critical time is dependent on at least one geometrical parameter of an optical subsystem with which the return light signal is received at the receiver unit.

9. The instrument according to claim 1, further comprising a front lens having an optical path along the instrument optical axis, wherein the deflection module is located optically between the front lens and at least one of the transmitter unit and the receiver unit.

10. The instrument according to claim 1, wherein the measurement instrument is further configured to regulate the attenuation of said attenuator for a travelling transmit light signal, as time passes, from a time event related to the emission of the travelling transmit light signal until reception of the return light signal corresponding to said travelling transmit light signal or until emission of a subsequent transmit light signal or until a time period elapsed since said time event exceeds a threshold.

11. A method of operating a measurement instrument, comprising:
transmitting a transmit light signal along a transmit path at an emission time;
receiving at a receive time a return light signal along a receive path;
deflecting, with at least one deflection module, at least one of the transmit path and the receive path at a deflection angle relative to an optical axis of the instrument;
converting the return light signal to a return electrical signal;
selecting a time-dependent attenuation function based on information relative to the deflection angle;
applying an attenuation to at least one of the return light signal and the return electrical signal according to the selected time-dependent attenuation function; and
determining a measured distance based on at least the emission time and the receive time;
wherein a set of time-dependent attenuation functions are based on an optical arrangement and type of said at least one deflection module, and wherein for a certain orientation or displacement of said at least one deflection module, the time-dependent attenuation function is selected out of the set of time-dependent attenuation functions.

12. The method according to claim 11, further comprising detecting an angle of rotation and/or a translational displacement of a deflection element arranged to deflect said at least one of the transmit path and the receive path, wherein the information relative to the deflection angle includes the detected angle of rotation and/or the detected translational displacement.

13. The method according to claim 11, wherein the information relative to the deflection angle includes a starting position of a deflection element arranged to deflect said at least one of the transmit path and the receive path relative to the instrument optical axis and at least one of a rotation speed, a translation speed, and a displacement profile of said deflection element.

14. The method according to claim 11, wherein the time-dependent attenuation function includes a maximum of attenuation at a critical time elapsed since the emission time of said transmit light signal.

15. The method according to claim 14, wherein the critical time is dependent on at least one geometrical parameter of an optical subsystem with which the return light signal is received.

16. The instrument according to claim 1, further comprising a center unit having the instrument optical axis as optical axis and wherein said at least one deflection module, said transmitter unit, and said receiver unit are arranged within the center unit.

17. The instrument according to claim 16, wherein the center unit is arranged to be mounted on an alidade for rotation about a first axis and the alidade is mounted on a base for rotation about a second axis intersecting the first axis.

18. The instrument according to claim 1, wherein the time-dependent function to be used is selected depending on the orientation, position and/or configuration of the deflection module in the distance measurement instrument.

* * * * *